US007956870B2

(12) United States Patent
Snyder et al.

(10) Patent No.: US 7,956,870 B2
(45) Date of Patent: Jun. 7, 2011

(54) SYSTEMS AND METHODS FOR PROVIDING IMAGE RENDERING USING VARIABLE RATE SOURCE SAMPLING

(75) Inventors: John Michael Snyder, Redmond, WA (US); John Turner Whitted, Carnation, WA (US); William Thomas Blank, Bellevue, WA (US); Kirk Olynyk, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 896 days.

(21) Appl. No.: 10/982,609

(22) Filed: Nov. 4, 2004

(65) Prior Publication Data

US 2005/0093876 A1 May 5, 2005

Related U.S. Application Data

(63) Continuation of application No. 10/185,082, filed on Jun. 2, 2002, now Pat. No. 6,943,805.

(51) Int. Cl.
*G09G 5/00* (2006.01)

(52) U.S. Cl. ........ 345/606; 345/423; 345/545; 345/547; 345/552; 345/611; 345/612; 345/614; 382/260; 382/261; 382/264; 382/274; 382/299; 382/300

(58) Field of Classification Search .......... 345/607–610, 345/612, 614, 615; 382/271
See application file for complete search history.

(56) References Cited

U.S. PATENT DOCUMENTS

| | | | | |
|---|---|---|---|---|
| 5,861,891 A | 1/1999 | Becker | | 345/433 |
| 6,359,619 B1 | 3/2002 | Waters et al. | | 345/426 |
| 6,417,861 B1 | 7/2002 | Deering et al. | | 345/589 |
| 6,459,428 B1 | 10/2002 | Burk et al. | | 345/419 |
| 6,476,829 B1 | 11/2002 | Smith et al. | | 345/764 |
| 6,489,956 B1 | 12/2002 | Deering | | 345/419 |
| 6,501,483 B1 * | 12/2002 | Wong et al. | | 345/611 |
| 2002/0122044 A1 | 9/2002 | Deering | | 345/597 |
| 2005/0035973 A1 * | 2/2005 | Snyder et al. | | 345/582 |

OTHER PUBLICATIONS

Catmull, E. et al., "3-D Transformations of Images in Scan-Line Order," *SIGGRAPH 80,* 1980, 279-285.
Carpenter, L., "The A-Buffer, An Antialiased Hidden Surface Method," *SIGGRAPH 84,* 1984, 103-108.
Chen, K-C. et al., "Directional Moving Averaging Interpolation for Bilinear Texture Mapping," *Proceedings of the SPIE—The International Society for Optical Engineering,* Sep. 25-28, 1994, Chicago, Illinois, 2308(2), 775-786.
Clare, J.F. et al., "Variance in the Mean of a Sequence of Partially Correlated Measurements," *Metrologia,* 1990, 27(4), 193-200.

(Continued)

*Primary Examiner* — Antonio A Caschera
(74) *Attorney, Agent, or Firm* — Woodcock Washburn LLP

(57) ABSTRACT

Systems and methods are provided for variable source rate sampling in connection with image rendering, which accumulate and resolve over all samples forward mapped to each pixel bin. In accordance with the invention, the textured surface to be rendered is sampled, or oversampled, at a variable rate that reflects variations in frequency among different regions, taking into account any transformation that will be applied to the surface prior to rendering and the view parameters of the display device, thus ensuring that each bin of the rendering process receives at least a predetermined minimum number of samples. A variety of image processing applications are contemplated wherein variable rate source sampling, and accumulation and resolution of forward mapped point samples can be applied, ranging from 3-D graphics applications to applications wherein images recorded in a recording/storage environment are mapped to the arbitrary requirements of a display environment.

33 Claims, 14 Drawing Sheets

OTHER PUBLICATIONS

Grossman, J.P. et al., "Point Sample Rendering," *Rendering Techniques '98: Proceedings of the Eurographics Workshop,* Jun. 29-Jul. 1, 1998, Vienna, Austria, 181-192.

Ji, W.G. et al., "Digital X-Ray Imaging Using Amorphous Selenium: Reduction of Aliasing," *Med. Physics,* 1998, 25(11), 2148-2162.

Kim, J.H. et al., "An Effective Lowpass Temporal Filter Using Motion Adaptive Spatial Filtering," *IEICE Trans. On Fundamentals of Electronics Communs. and Comp. Sci.,* 1992, E75A(2), 261-264.

Laur, D. et al., "Hierarchical Splatting: A Progressive Refinement Algorithm for Volume Rendering Point Sample Rendering," *Computer Graphics;* 1991, 25(4), 285-288.

Lengyel, J. et al. "Rendering with Coherent Layers," *SIGGRAPH '97,* 1997, 10 pages.

Levitan, B. et al., "Parallel Cone Bipolar to On-Beta Ganglion Cell Pathways in the Cat Retina: Spatial Responses, Spatial Aliasing, and Spatial Variance," *J. Optical Soc. America,* 1996, 13(6), 1152-1165.

Levoy, M. et al., The Use of Points as Display Primitives, *Technical Report TR 85-022,* The University of North Carolina at Chapel Hill, Department of Computer Science, 1985, 1-13.

Mark, W. et al., "Memory Access Patterns of Occlusion-Compatible 3D Image Warping," *Proceedings of 1997 SIGGRAPH/Eurographics Workshop on Graphics Hardware,* Los Angeles, CA, Aug. 3-4, 1997, 35-44.

Mitchell, D., Generating Antialiased Images at Low Sampling Densities, *Computer Graphics,* 1987, 21(4), 65-72.

Nishiyama, H. et al., "Non-Equally-Spaced Pulse Transmission for Non-Aliasing Ultrasonic Pulsed Doppler Measurement," *J. Acoustical Soc. Japan (E),* 1992, 13(4), 215-222.

Pfister, H. et al., "Surfels: Surface Elements as Rendering Primitives," *SIGGRAPH 2000,* 2000, 335-342.

Polivka, W.M., "Resolution of an Averaging Paradox in the Analysis of Switched-Mode DC-DC Converters," *IEEE Trnas. On Aerospace and Electronic Systems,* 1994, 30(2), 626-632.

Popescu, V. et al., "The WarpEngine: An Architecture for the Post-Polygonal Age," *SIGGRAPH 2000,* 2000, 433-442.

Ray, R.D., "Spectral Analysis of Highly Aliased Sea-Level Signals," *J. Geophysical Research-Oceans,* 1998, 103(C11), 24991-25003.

Rusinkiewicz, S. et al., "Qsplat: A Multiresolution Point Rendering System for Large Meshes," *SIGGRAPH 2000,* 2000, 343-352.

White, D.R. et al., "Noise in Measurements Obtained by Sampling," *Measurement Sci. & Technol.,* 1992, 3(1), 1-16.

Torborg, J. et al., "Talisman: Commodity Realtime 3D Graphics for the PC," *SIGGRAPH '96,* 1996, 353-363.

Westover, L., "Footprint Evaluation for Volume Rendering," *Computer Graphics,* 1990, 24(4), 367-376.

Wolberg, G., *Digital Image Warping,* IEEE Computer Society Press, Los Alamitos, CA, 1990.

* cited by examiner

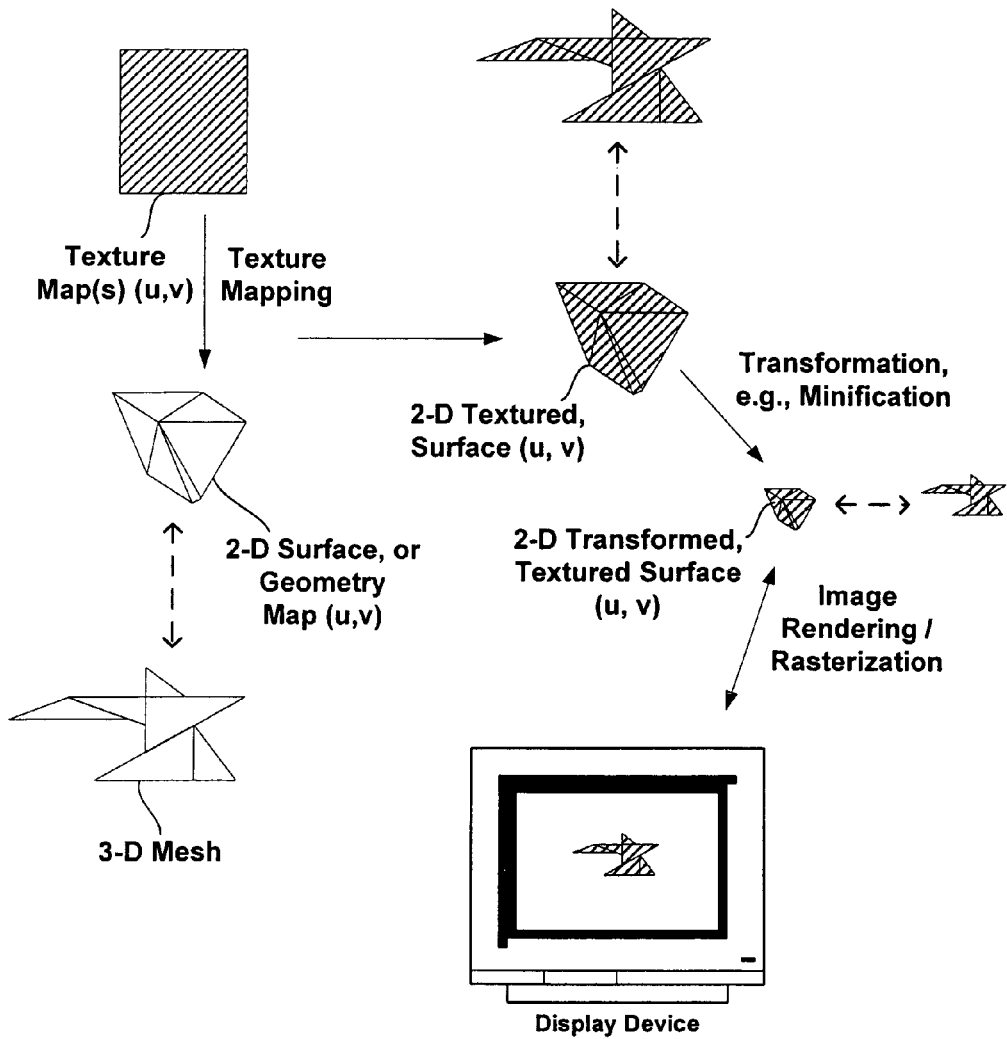
**FIG. 1A - Prior Art
Image Rendering**

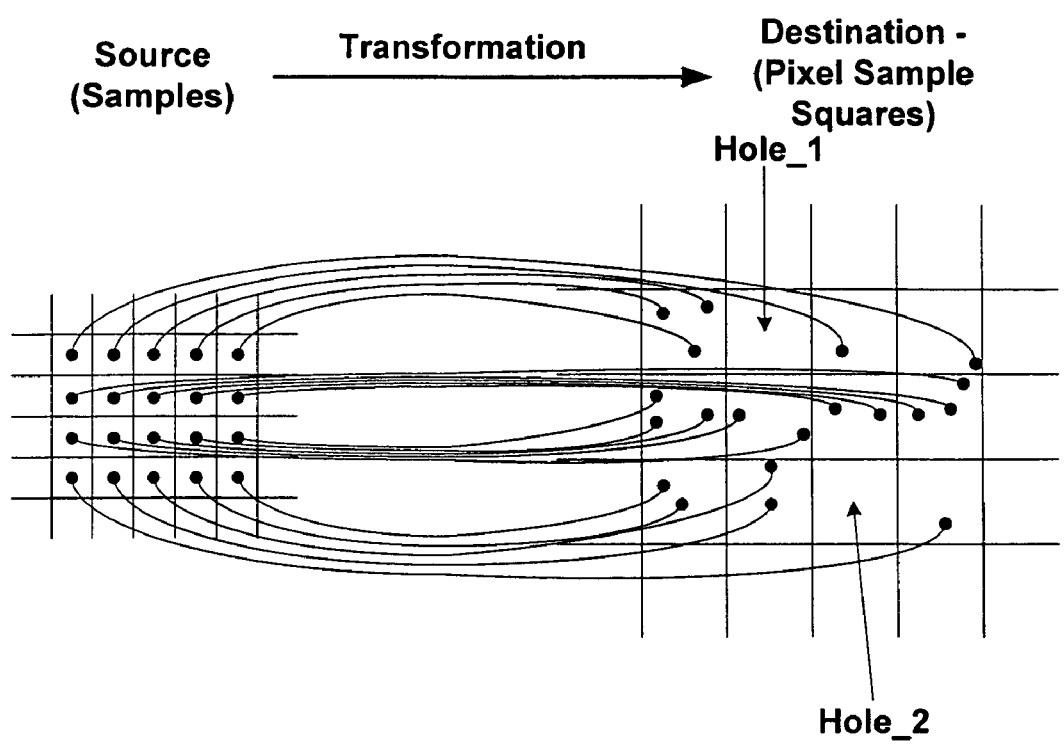
**FIG. 1B - Prior Art
Forward Mapping**

 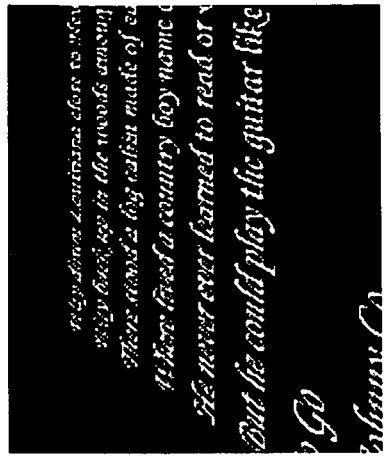
 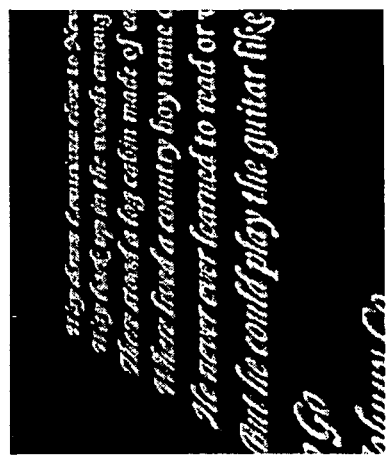
*FIG. 10A*  *FIG. 10B*
 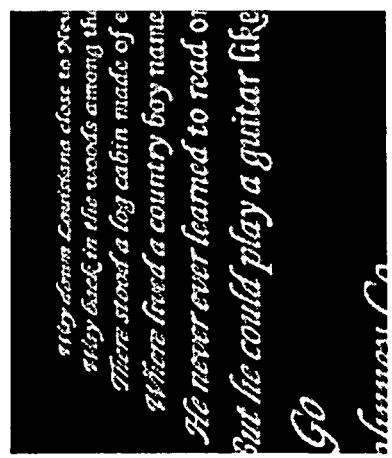

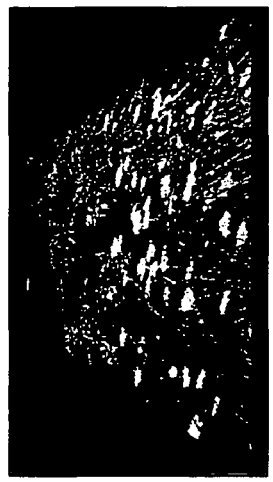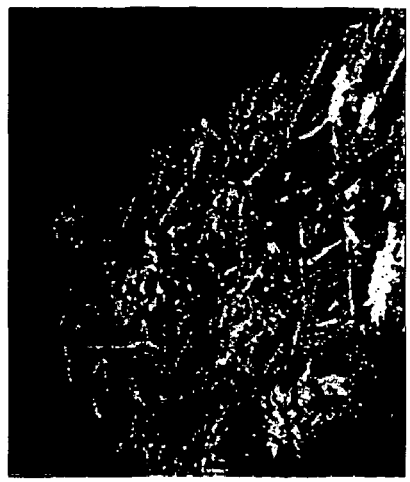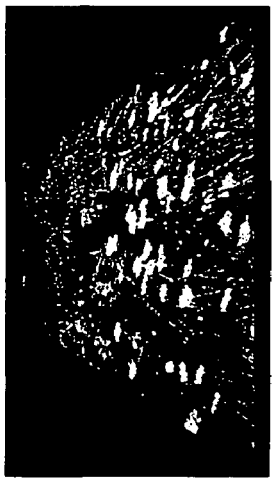
FIG. 10C
FIG. 10D

SYSTEMS AND METHODS FOR PROVIDING IMAGE RENDERING USING VARIABLE RATE SOURCE SAMPLING

CROSS-REFERENCE TO RELATED APPLICATIONS

This application is a continuation of U.S. application Ser. No. 10/185,082, filed Jun. 28, 2002, entitled "Systems and Methods for Providing Image Rendering Using Variable Source Sampling," issued on Sep. 13, 2005 as U.S. Pat. No. 6,943,805.

This application relates to commonly assigned U.S. patent application Ser. No. 10/945,827, filed Sep. 21, 2004, entitled "Systems and Methods for Indexing Content for Fast and Scalable Retrieval" (MSFT-3968/177757.02).

FIELD OF THE INVENTION

The present invention is directed to systems and methods for rendering images at a very high image quality. More particularly, the present invention relates to systems and methods for providing source-sample centric rendering using variable rate source sampling.

BACKGROUND OF THE INVENTION

Conventionally, as illustrated in FIG. 1A, complex three dimensional (3-D) objects, or portions thereof, can be represented by collections of adjacent triangles ("a mesh") representing the approximate geometry of the 3-D object, or by a geometry map, or surface, in two dimensional (2-D) surface space. One or more texture maps can be mapped to the surface to create a textured surface according to a texture mapping process. In a conventional graphics system, the surface geometry sampling happens before texture sampling. In this regard, signals textured over a surface can be very general, and can specify any sort of intermediate result that can be input to a shader procedure to produce a final color associated with a point sample, and thus need not specify a function of color or grey scale values.

After texture sampling, additional transformations can optionally be applied to the textured surface prior to rendering the image with picture elements (pixels) of a display device. Images in computer graphics are represented as a 2-D array of discrete values (grey scale) or as three 2-D arrays of discrete values (color). Using a standard (x, y, z) rectangular coordinate system, a surface can be specified as a mesh (e.g., triangle mesh) with an (x,y,z) coordinate per mesh vertex, or as a geometry map in which the (x,y,z) coordinates are specified as a rectilinear image over a 2D (u,v) coordinate system, called the surface parameterization domain. Texture map(s) can also be specified with the (u, v) coordinate system.

Point samples in the surface parametrization domain, where signals have been attached to the surface, including its geometry, can be generated from textured meshes or geometry maps. These samples can be transformed and shaded using a variety of computations. At the end of this transformation and shading processing, a point sample includes (a) positional information, i.e., an image address indicating where in the image plane the point maps to and (b) textured color, or grey scale, information that indicates the color of the sample at the position indicated by the positional information. Other data, such as depth information of the point sample to allow hidden surface elimination, can also be included. The transformed, textured surface is placed in a frame buffer prior to being rendered by a display in 2-D pixel image space (x, y).

At this point, in the case of a black and white display device, each (x, y) pixel location in 2-D image space is assigned a grey value in accordance with some function of the surface in the frame buffer. In the case of a typical color display device, each (x, y) pixel location in 2-D image space is assigned red, green and blue (RGB) values. It is noted that a variety of color-formats other than RGB exist as well.

In order to render the surface on the display device itself, conventionally, the textured surface is sampled at positions that reflect the centers of the pixels of the device on which the image is to be displayed. Conventionally, this sampling is performed by evaluating a function of the transformed, textured surface, at points that correspond to the center of each pixel, by mapping the centers of the pixels back into texture space to determine the point sample that corresponds to the pixel center.

In particular, the current rasterization architecture raster scans a triangle of the mesh to find the pixel centers it covers, and then maps each covered pixel center (x, y) back into texture space to get a texture location (u, v) that maps to each covered pixel center (x, y) along with some representation of the neighborhood of the (x, y) pixel center, e.g., by mapping x and y image tangent vectors back into texture space to get two vectors Vx and Vy. Then, for each pixel center covered by the triangle, the (u, v) point is used to define the filter center and Vx and Vy are used to define the filter shape to reconstruct a texture value for the pixel center.

Thus, the current rasterization architecture only samples at pixel centers, which is not an effective way to antialias images in all cases. For instance, in the current architecture, if the mesh is sub-divided into a greater number of smaller triangles, which is analogous to source sampling at a higher rate, at some point, the exact same image is nonetheless produced. Without increasing the image size, using smaller triangles fails to achieve antialiasing because most of these small triangles do not cover a pixel center and, as a result, are totally ignored by the current rasterization architecture. The current architecture works reasonably well when the texture map contains all the frequency information, because the texture can be represented as a pre-computed MIP-Map; however, true anisotropic filtering is very costly for the present architecture to achieve. If the frequency information is stored as a per-vertex signal over the geometry, or is due to boundaries between separate meshes, i.e., if the frequency information is not represented as a pre-filtered texture map, then the only way to antialias is to increase image resolution, otherwise known as supersampling.

It would thus be desirable to accumulate and filter over all point samples that map to bin(s), such that the more point samples a bin receives, the better the antialiasing is with respect to that bin. It would also be desirable to provide a mechanism to control the number of samples received by the bin(s), to provide a controllable level of antialiasing in accordance with application tradeoffs and frequency of source content. Thus, there is a need for an improved graphics architecture and techniques that overcome the limitations of the conventional graphics architecture.

Forward mapping, or rendering algorithms that sample content and then map samples onto a display surface, have become more appealing recently. Forward mapping directly maps surface data onto the image plane. For each surface element, the renderer maps the point onto the image plane. Thus, once the destination image has been selected, the process transitions through each sample of the source image in order, e.g., scan-line order, an order determined by tiling, an order that addresses interleaving (swizzling), etc., and determines its position in the destination image.

Example applications include image based rendering (IBR), volume rendering and rendering of extremely complex scenes. For instance, sampling at the source rather than the destination of an imaging process is a standard technique in video applications. In these methods, source image samples are mapped to the destination to reconstruct and resample an image at the display sample rate. If separable filters are employed, the process can be decomposed into cascaded one dimensional (1-D) interpolation and filtering. Typical practice in computer graphics as described above, whether in polygon rasterizers or ray tracers, has been the opposite—to map destination samples backward into texture source space.

It is clear, however, that dealing with problems in maintaining image quality with forward mapping approaches requires (1) care in adjusting the source sampling rate to adequately capture detail and (2) care in reconstructing and resampling the destination signal to eliminate aliasing. While both points remain a problem for present forward mapping approaches, the second consideration is particularly a weak point and thus a forward mapping approach that adequately addresses both problems is currently desired.

Thus, recent publications have described methods that map samples forward from source to destination. Such forward mapping approaches have several advantages over the traditional architecture, which first maps display samples back to the texture domain to reconstruct the destination signal. Forward mapping (1) avoids unnecessary rasterization and interpolation over complicated geometric primitives like triangles, (2) better exploits coherence in the source signal, since it can be visited in optimal order instead of one that depends on how the textured geometry projects to the texture domain and (3) treats antialiasing of geometry and texture uniformly, avoiding redundant texture filtering that occurs when supersampling to antialias the geometry. Forward mapping, however, can result in holes in an image that undergoes transformation, e.g., image warping, perspective transformation, etc., because some pixels in the destination image are not "filled in" by any locations from the source image, and are effectively left blank by the mapping. See, for illustration, FIG. 1B. Generally speaking, the severity of space left empty by such a forward mapping process can increase with the complexity or severity of change introduced by a transformation. Moreover, when there are multiple layers of objects in the z-plane of the image space, some of which should occlude others, a hole in a first object at the forefront of the image may reveal a second object through the hole.

Current forward mapping approaches employ complex schemes to avoid the above-described undersampling that leaves gaps, or holes, between mapped samples where the source signal is magnified, but such complex approaches are presently inadequate for a variety of reasons. Attempts to employ source-based sampling for 3-D surface rendering have been made, and research papers have proposed some source-based sampling schemes, but these attempts and schemes have not achieved any commercial success. For volume rendering, extremely simple forward mapping algorithms can be used, but these algorithms disadvantageously have large destination footprints.

Specifically, Grossman and Dally propose using a minimal sampling rate in the source space and then filling in gaps with a hierarchical averaging scheme. The QSplat system stores surface samples in a hierarchical data structure and avoids holes by rasterizing projected spherical primitives that bound the surface. The "surfels" algorithm uses a hole filling routine similar to Grossman and Dally, but exploits area primitive rasterization, or "visibility splatting," to detect holes.

In brief, currently proposed forward mapping schemes propose to handle this "hole" problem either (1) by rasterizing big geometric "splats" (of variable size) instead of points so that z-buffer values are rasterized for the entire big splat and nothing shows throw, or (2) by performing the image interpolation in places where no splat was mapped using a z-pyramid that prevents occluded objects from showing through an occluding object. These methods, however, are very complex and introduce computational overhead in terms of both computing time and other resources like memory bandwidth. For example, the first technique moves away from the elegant idea of, and thus the information embodied by, point samples and ends up rasterizing area elements, in essence returning to the conventional architecture described above. Also, these techniques essentially use a z-buffer over a pixel grid to resolve hidden surfaces, and so only take account of one splat, i.e., the frontmost splat, per pixel, and thus potentially eliminate content that should be reflected by the end result.

Additionally, designing hardware specifically for IBR requires careful attention to the order and timing of memory access. In this regard, one problem with present techniques is that they do not target applications that combine conventional graphics with IBR and video. Memory access remains a central problem, and an architecture tuned to IBR alone and ignoring 3D graphics is insufficient. The geometric database for a typical real-time rendering application is such that surface elements project to areas smaller than the spacing between display samples. The futility of rasterizing such tiny elements has led to the need for new, forward-mapping rendering architectures, some recent proposals for which, as mentioned above, devote considerable effort to eliminating gaps between mapped samples.

Hence, several areas for improvement remain in presently proposed architectures. For instance, a question that needs to be determined in connection with source. sampling is how much source sampling is enough. To answer this question, some source-frequency-based sampling criteria must be utilized. Some approaches assume a sampling rate in accordance with the resolution of the display device. A drawback of such an approach is that to sample content at the resolution of the display device inherently assumes that a single sampling rate is appropriate for all portions of the image. However, different parts of an image may have different frequencies. For example, significant change in pixel intensity occurs at the edge of an object or texture, e.g., at the edges of the stripes of a zebra, and thus exhibits high frequencies. In contrast, over a smooth surface of an object with uniform color, there is little change and thus the region can be represented with fewer samples. Thus, in order to capture an appropriate level of detail in the image, it would be desirable to sample one portion of the image at one frequency, and another portion of the image at a different frequency, and so on, for different regions of the surface being sampled.

Moreover, another question that needs to be determined is how to ensure that sufficient coverage is achieved by the source sampling in the destination to avoid the complicated hole-filling work of previous forward mapping approaches. To answer this question, some geometric-coverage criteria must also be utilized. Grossman and Dally describe a criterion that guarantees coverage given a uniform, rectangular destination sampling lattice, whereby the length of the longest side of an (imaginary) triangle mesh through the mapped source samples must not exceed the distance between destination samples. Based on this criterion, it is further observed by Grossman and Dally that improved efficiency results from a hexagonal source sampling, forming equilateral triangles which are less likely to have unbalanced triangle edge lengths after mapping. Such a source sampling is typically not convenient to obtain, however, requiring special-purpose image resampling. Additionally, evaluating this metric at numerous source samples is impractical.

Another question is how to sufficiently antialias in such a system. In low-cost, real-time systems, antialiasing is achieved by standard oversampling followed by filtering and decimation. Mitchell, for example, uses a non-linear process to reconstruct images from irregularly scattered samples for ray tracing.

A different antialiasing approach that has been used in both forward and traditional inverse-mapped graphics is signal pre-filtering, a technique that resamples the source signal at various levels of frequency content as a preprocessing step. Unfortunately, for 3-D graphics and even for perspectively transformed 2-D graphics, effective pre-filtering is difficult. The standard MIP-Map pyramid approach constructs a 1-D sequence of increasingly decimated signal versions, but the decimation is isotropic and thus blurs too much, or alternatively, "leaks" aliasing, if one direction in the source signal is minified more than another. This is a common effect of projections of 3-D geometry near silhouettes and foreshortened 2-D perspective transformations. As a result, inverse-mapping 3-D graphics hardware is moving toward anisotropic filtering of greater sophistication and extent of anisotropy handled, but at the expense of computational complexity. Moreover, aliasing problems due to "minification", where high frequency source content is compressed into a small region in the destination, has always been a problem for present techniques and thus there is a need for a technique that addresses the minification case in a superior manner. Present forward-mapping approaches, e.g., the technique provided Grossman and Dally, thus far have either ignored minification aliasing, or have used MIP-Map pyramids that fail to address the need for anisotropic filtering.

Additionally, in order to make best use of available hardware, many existing forward mapping schemes have been shoehorned into a conventional polygon rendering pipeline. However, to fully realize its benefits, forward mapping merits a new architecture. While specialized IBR processor have been proposed, there is a clear need in the art for architectures that are more programmable.

In brief, while present rasterization architectures can effectively antialias signals represented as texture maps, it is due to such architectures' use of expensive backward mapping and on-the-fly trilinear and anisotropic filtering. Signals not represented as texture maps can only be antialiased by supersampling.

It would thus be desirable to improve upon present rasterization architectures that sample only at pixel centers and presently proposed forward mapping architectures by providing a process that resolves over all samples received by bin(s), whereby effective antialiasing is achieved by generating more samples at the source, without adding any more bin(s). It would be further desirable to provide a process that filters over all point samples that lie in a bin, no matter how many are present. It would be still further desirable to provide a controllable sampling process that ensures that each bin receives at least a predetermined number of samples.

SUMMARY OF THE INVENTION

In view of the foregoing, the present invention provides systems and methods for providing image rendering using variable source rate sampling, which accumulate and resolve over all samples forward mapped to each pixel bin. In accordance with the invention, the textured surface to be rendered is sampled, or oversampled, at a variable rate that reflects variations in frequency among different regions, taking into account any transformation that will be applied to the surface prior to rendering and the view parameters of the display device, thus ensuring that each bin of the rendering process receives at least a predetermined minimum number of samples. In one embodiment, the sampling rate is variably set such that each bin is assured to have at least one sample point. In another embodiment, a tiling approach to division of the surface is utilized. In accordance with the architecture provided by the invention, the sample points of the surface are forward mapped to sample squares, or other types of regions, of a rendering device, taking into account any transformations applied to the surface and the view parameters of the rendering device, such that each bin receives at least the predetermined minimum number of samples. A filter determines the value(s) to assign to each pixel based upon accumulation and resolution, e.g., taking the mean, taking the median, taking the mode, taking the minimum, taking the maximum, applying a least squares fit or applying some other function, of all of the sample points that fall within the pixel bin(s), rather than assigning a value by selecting only the point sample that corresponds to the center of the pixel.

The invention thus eliminates gaps or holes left by conventional forward-mapping techniques more simply by oversampling the source(s), and generating interpolated points at a higher rate than the original source signal(s) to adequately cover the destination bins. The invention uses a pixel, or sub-pixel, binning approach that accumulates and resolves over all samples, and performs particularly well compared to prior architectures in areas that have higher frequency content, solving the minification antialiasing problem and producing a high quality result. Anisotropic filtering is handled simply with the forward mapping approach of the invention by filtering over all samples that naturally accumulate after the forward map, and via variable control of the number of samples forward mapped to the bins.

The invention may be applied to a variety of image processing applications wherein variable rate source sampling, and accumulation and resolution of forward mapped point samples can be applied, ranging from 3-D graphics applications to applications wherein images recorded in a recording/storage environment are mapped to the arbitrary requirements of a display environment, e.g., when an image recorded on a charge coupled device (CCD) is mapped to an arbitrary quadrilateral of a liquid crystal display (LCD).

Other features and embodiments of the present invention are described below.

BRIEF DESCRIPTION OF THE DRAWINGS

The file of this patent includes at least one drawing executed in color. Copies of this patent with color drawings will be provided by the United States Patent and Trademark Office upon request and payment of the necessary fee.

The system and methods for providing variable rate source sampling in accordance with the present invention are further described with reference to the accompanying drawings in which:

FIG. 1A illustrates some background information with respect to rendering 3-D images in computer graphics;

FIG. 1B illustrates a problem associated with forward mapping solved in accordance with one aspect of the present invention;

FIGS. 10A to 10D illustrate images that compare the techniques of the invention with MIP-Map pre-filtering techniques.

DETAILED DESCRIPTION OF THE INVENTION

Overview

Figure 2A:
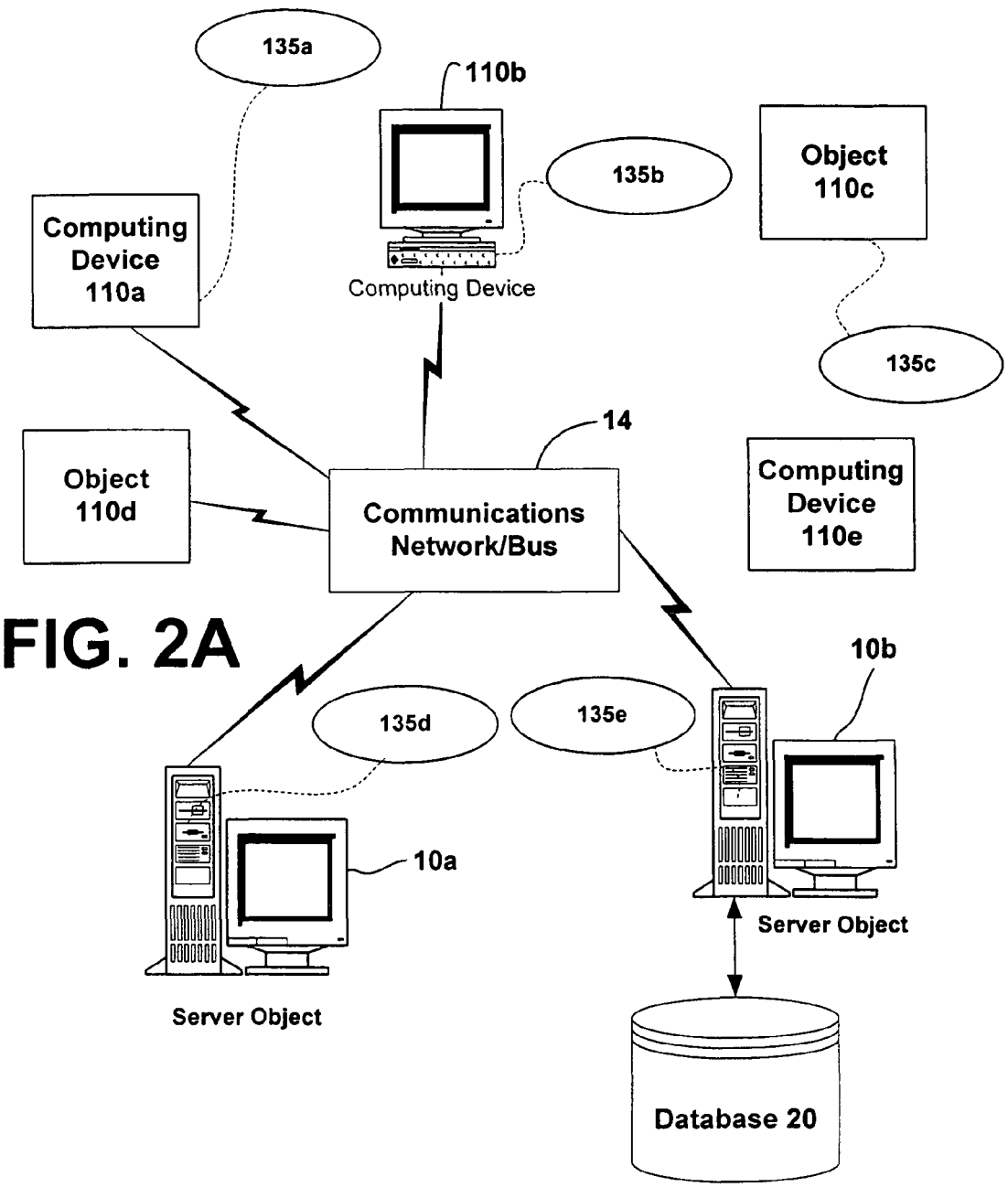
FIG. 2A is a block diagram representing an exemplary network environment having a variety of computing devices in which the present invention may be implemented.

The invention thus provides methods and systems for providing image rendering using variable source rate sampling, and for accumulating and resolving all samples forward mapped to a bin. In accordance with the invention, the surface, e.g., the textured geometry, to be rendered is sampled, or oversampled, at a variable rate that reflects variations in frequency among different regions, taking into account any transformation that will be applied to the surface prior to rendering and the view parameters of the rendering device, thus ensuring that each bin of rendering process includes at least a predetermined number of sample, e.g., at least one sample per bin. High frequency regions of the source, i.e., those regions having a finer level of detail, are sampled at a higher rate than low frequency regions of the source. In one embodiment, a tiling approach to division of the source(s) is proposed. A geometry map can be used to correlate texture samples with points on the surface. The methods of the invention can use a geometry map, but the methods also apply to triangle mesh geometry as well. In accordance with the invention, the source sampler/mapper is tailored to the kind of representation utilized while ensuring a sufficient number of point samples is generated; the back end of the rasterization architecture that accumulates and resolves the point samples works independently of how the geometry is represented. Once the point samples are generated, the accumulation and resolution proceeds irrespective of the original representation of the geometry. The resolution process may be any sort of computation based upon all of the accumulated samples, e.g., taking the mean, taking the median, taking the mode, taking the minimum, taking the maximum or applying some other function, to select a single color as a representation. The computation could also be applied to a model that includes spatial variation of color or depth over the bin, wherein a least squares fit of some representation of the samples is applied.

The surface may be transformed, e.g., rotated, translated, magnified, minified (zoomed out), etc., by applying a transformation to the coordinates of each sample point, e.g., via a transformation matrix, whereby the transformation is carried out using matrix multiplication to apply the transformation to the coordinates of the sample points. For instance, a perspective transformation uses a 4×4 matrix transformation followed by division by the w coordinate.

One or more textures may be applied to a geometry. The texture, like the geometry, has varying frequency content, and thus introduces further input to the variable rate sampling. A geometry map can be used to correlate texture samples with points on the surface. A geometric mesh also provides this correlation, by explicitly denoting how each triangle on the mesh maps to texture space. This can be done, for instance, by tagging each triangle vertex with (u,v) coordinates and assuming linear interpolation of these coordinates within the triangle.

The transformed sample points are assigned to sample squares, or some other regional division of the rendering device, where each sample square corresponds to a pixel on the device on which the image is to be rendered. In one embodiment, the (x,y) position of the sample on the image is quantized to find its corresponding bin. A filter determines the setting of a pixel based on the sample points that fall within the pixel's corresponding sample square. Each sample square comprises "bins," with each bin occupying a delimited portion of the sample square, and the filter determines the settings of the pixels based on accumulation and resolution of the sample points in the bin(s). The sampling rates are variably set to ensure that each bin receives at least a predetermined number of sample points.

The invention thus eliminates gaps or holes left by conventional forward-mapping techniques more simply by oversampling the source(s), and generating interpolated points at a higher rate than the original source signal(s) to adequately cover the destination bins. The invention further uses a pixel, or sub-pixel, binning approach that accumulates and resolves over samples in the areas that have higher frequency content to solve the minification antialiasing problem and produce a high quality result. Anisotropic filtering is handled simply with the forward mapping approach of the invention by filtering over a greater number of samples that naturally accumulate after the forward map (e.g., in foreshortened regions such as near silhouettes of curved surfaces).

Contributions of the invention include, but are not limited to, a simple, brute-force oversampling approach to forward-mapping, which can be implemented in hardware, and which easily handles anisotropic projections of the source signal and produces higher-quality results than previous approaches. Mapped samples are accumulated into a set of destination bins, using a variable sampling rate that ensures that each destination bin receives at least one sample. The samples in each bin are accumulated and normalized. Output samples are then generated with a filtering process, e.g., Mitchell's cascaded resampling filter can be used if the surface was supersampled according to the variable sampling of the invention. The techniques of Grossman and Dally are extended by the invention to estimate the oversampling necessary to guarantee coverage, using image tiles to make the approach practical. The current implementation may optionally handle the case of occlusion, and allows arbitrary mappings, including perspective projection and projection of texture-mapped 3-D geometry within a single layer.

Additionally, the invention may be applied to a variety of image processing applications wherein variable rate source sampling, and accumulation and resolution of forward mapped point samples can be applied, ranging from 3-D graphics applications to applications wherein images recorded in a recording/storage environment are mapped to the arbitrary requirements of a display environment, e.g., when an image recorded on a CCD is mapped to an arbitrary quadrilateral of an LCD.

Exemplary Networked and Distributed Environments

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes, which may be used in connection with a forward mapping process. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local forward mapping services.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may implicate a forward mapping process that may utilize the techniques of the present invention.

FIG. 2A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as personal digital assistants (PDAs), televisions, Moving Picture Experts Group (MPEG-1) Audio Layer-3 (MP3) players, televisions, personal computers, etc. Each object can communicate with another object by way of the communications network 14. This network may itself comprise other computing objects and computing devices that provide services to the system of FIG. 2A. In accordance with an aspect of the invention, each object 10a, 10b, etc. or 110a, 110b, 110c, etc. may contain an application that might request forward mapping services.

In a distributed computing architecture, computers, which may have traditionally been used solely as clients, communicate directly among themselves and can act as both clients and servers, assuming whatever role is most efficient for the network. This reduces the load on servers and allows all of the clients to access resources available on other clients, thereby increasing the capability and efficiency of the entire network. Forward mapping services and interfaces in accordance with the present invention may thus be distributed among clients and servers, acting in a way that is efficient for the entire network.

Distributed computing can help businesses deliver services and capabilities more efficiently across diverse geographic boundaries. Moreover, distributed computing can move data closer to the point where data is consumed acting as a network caching mechanism. Distributed computing also allows computing networks to dynamically work together using intelligent agents. Agents reside on peer computers and communicate various kinds of information back and forth. Agents may also initiate tasks on behalf of other peer systems. For instance, intelligent agents can be used to prioritize tasks on a network, change traffic flow., search for files locally or determine anomalous behavior such as a virus and stop it before it affects the network. All sorts of other services may be contemplated as well. Since graphical object(s) or other color data may in practice be physically located in one or more locations, the ability to distribute forward mapping services and interfaces is of great utility in such a system.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol, such as Power line, data.(both wireless and wired), voice, e.g., telephone, and entertainment media. Most home control devices such as light switches and appliances may use power line for connectivity. Data Services may enter the home as broadband (e.g., either DSL or Cable modem) and are accessible within the home using either wireless, e.g., Home Radio Frequency (HomeRF) or 802.11b, or wired, e.g., Home Phoneline Networking Appliance (PNA), Cat 5, even power line, connectivity. Voice traffic may enter the home either as wired, e.g., Cat 3, or wireless, e.g., cell phones, and may be distributed within the home using Cat 3 wiring. Entertainment media, or other graphical data, may enter the home either through satellite or cable and is typically distributed in the home using coaxial cable. IEEE. 1394 and digital video interface (DVI) are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of sharing data, such as data accessed or utilized incident to forward mapping image data or other color or graphical data in accordance with the present invention.

Moreover, color and grey scale are effective means to represent a variety of physical or other phenomena, and thus whether the data be magnetic resonance imaging data, ultrasound data, graphics equalizing data, etc., color is often an appropriate way to present the data to humans for fast perceptual analysis. Accordingly, the source for color or other image data as contemplated herein is limitless, and may undergo a series of transformations, prior to being considered "image" or "color" data.

The Internet commonly refers to the collection of networks and gateways that utilize the Transport Control Protocol/Interface Program (TCP/IP) suite of protocols, which are well-known in the art of computer networking. The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2A, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a URL address. For example, communication can be provided over a communications medium. In particular, the client and server may be coupled to one another via TCP/IP connections for high-capacity communication.

Thus, FIG. 2A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a video cassette recorder (VCR), television (TV), oven, light, heater and the like in accordance with the present invention. It is thus contemplated that the present invention may apply to any computing device in connection with which it is desirable to process or display graphical object(s) or any other color or image data.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 10a, 110b, 110c, 110d, 110e, etc., as may be characteristic of a distributed computing environment. Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 1110c, 110d, 110e, etc. and server computer 10a, 10b, etc. may be equipped with various application program modules or objects 135 and with connections or access to various types of storage elements or objects, across which files may be stored or to which portion(s) of files or images may be downloaded or migrated. Any computer 10a, 10b, 110a, 110b, etc. may be responsible for the maintenance and updating of a database 20 or other storage element in accordance with the present invention, such as a database or memory 20 for storing color or image object(s) or data or intermediate color or image object(s) or data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Figure 2B:
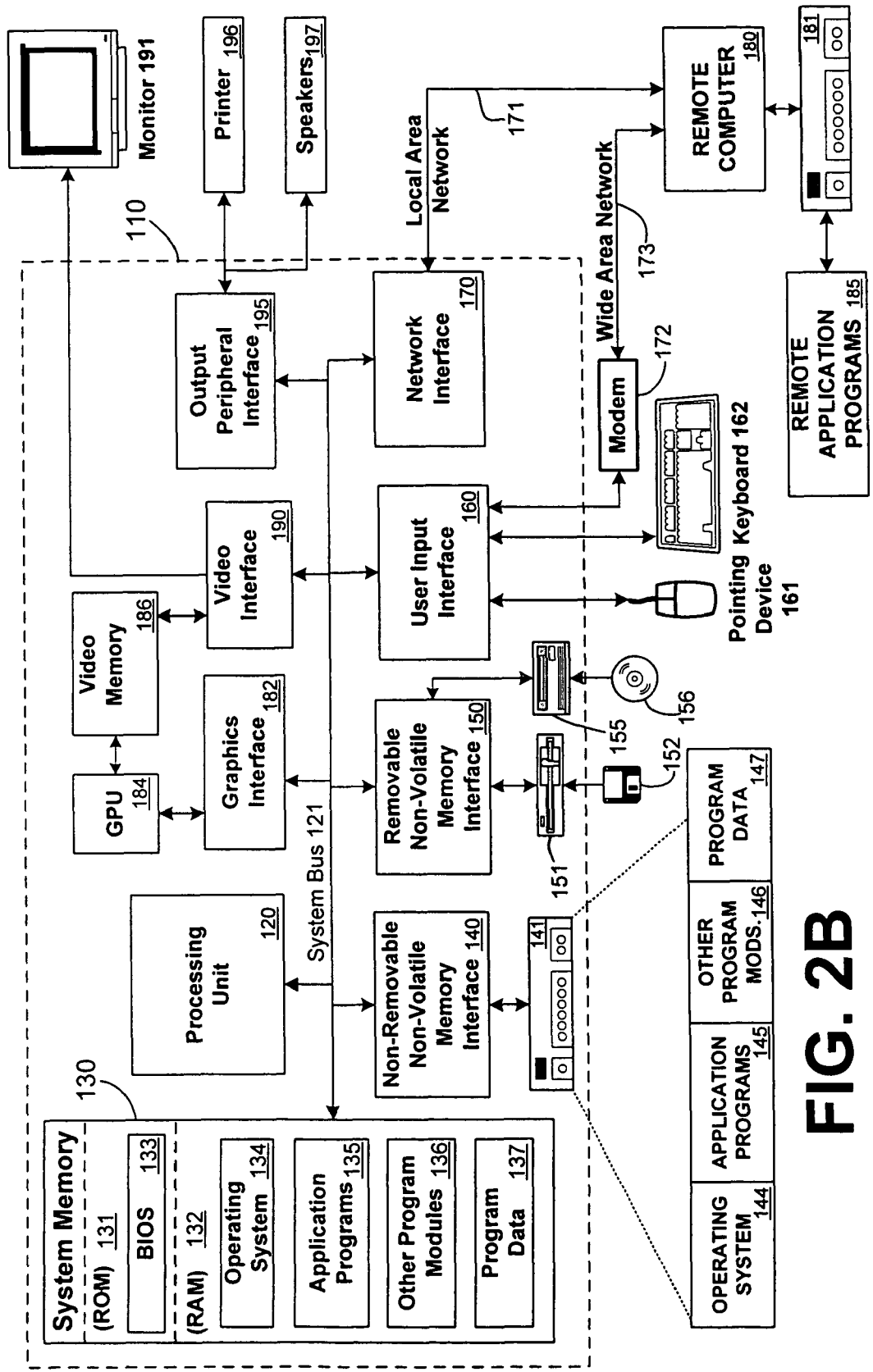
FIG. 2B is a block diagram representing an exemplary non-limiting computing device in which the present invention may be implemented.

FIG. 2B and the following discussion are intended to provide a brief general description of a suitable computing environment in which the invention may be implemented. It should be understood, however, that handheld, portable and other computing devices and computing objects of all kinds are contemplated for use in connection with the present invention, as described above. Thus, while a general purpose computer is described below, this is but one example, and the present invention may be implemented with other computing devices, such as a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation of the forward mapping techniques of the invention.

Although not required, the invention can be implemented via an operating system, for use by a developer of services for a device or object, and/or included within application software that operates in connection with the forward mapping techniques of the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 2B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 2B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated-on by processing unit 120. By way of example, and not limitation, FIG. 2B illustrates operating system 134, application programs 135, other program modules 136, and program data 137.

The computer 110 may also include other removable/non-removable, volatile/nonvolatile computer storage media. By way of example only, FIG. 2B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2B provide storage of computer readable instructions, data structures, program modules and other data for the computer 110. In FIG. 2B, for example, hard disk drive 141 is illustrated as storing operating system 144, application programs 145, other program modules 146, and, program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2B. The logical connections depicted in FIG. 2B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2B illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s NET platform includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well.

While exemplary embodiments herein are described in connection with software residing on a computing device, one or more portions of the invention may also be implemented via an operating system, application programming interface (API) or a "middle man" object between any of a coprocessor, a display device and requesting object, such that forward mapping services may be performed by, supported in or accessed via all of .NET's languages and services, and in other distributed computing frameworks as well.

Image Rendering using Variable Rate Source Sampling

As mentioned in the background, one problem associated with forward mapping is eliminating gaps or holes in the destination due to insufficient, or under-sampling. Many of the prior art techniques discussed attempt to "fill in" these holes with complicated interpolation or other algorithms, which not only adds much overhead to the process, but also is not always all that effective. Rather than provide a similar stopgap solution, the invention instead recognizes that the problem can be solved by providing enough samples at the front end such that at least one sample reaches each bin of the sample squares associated with the pixels, taking into account any transformation that will take place to the textured surface and the parameters of the display device. A naive solution would be to oversample at a rate sufficient for the worst case magnification over the entire surface mapping; however, this can grossly oversample in places that are not magnified as much as the worst case scenario. In this regard, the invention recognizes that a given piece of content may have different frequency content in different regions, and thus that the rate of sampling should be variable throughout the content to reflect these differing frequencies. The present invention thus provides a technique for rendering visual content, whereby the sampling rate is variable and based on the frequency of divided regions of the textured, transformed surface, taking into account the parameters for the destination and any transformation of the content that takes place incident thereto, and ensuring that at least one sample is mapped to each bin of the destination. The invention thus ensures that there are no holes in the destination image. Another aspect of the invention, described in more detail below, is the use of filtering over all samples that map to a given bin, rather than picking a single representative corresponding to the center of the pixel, to effectively reduce aliasing.

It is noted that some of the representative embodiments of the invention, for simplicity of description and illustration, show a one-to-one correspondence of "bins" to "pixels." The invention is not considered to be so limited. For instance, the architecture and concepts described herein can be applied to non-pixel based displays that implicate forward mapping. Moreover, there should be no inference from the embodiments described herein that there is a necessary correspondence of bin locations to display pixel locations, or other locations-in the destination device. Additionally, the use of regular sub-pixel locations for bins is purely for implementation convenience, and is not a constraint posed by the architecture of the invention.

Figure 3A:
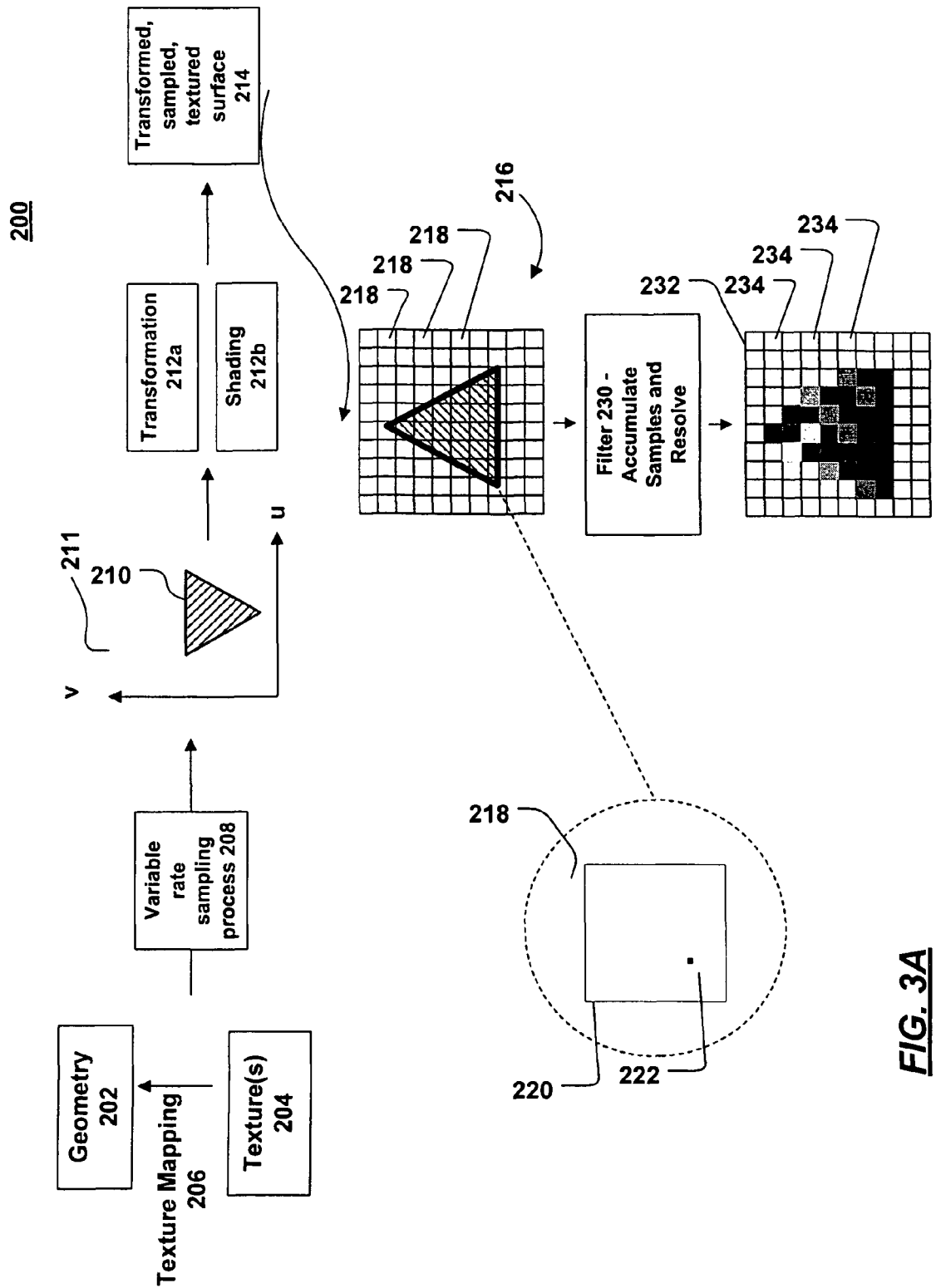
FIGS. 3A and 3B illustrate exemplary rendering according to the variable rate source sampling and accumulation and resolution of all samples in a bin of the invention.
Figure 3B:
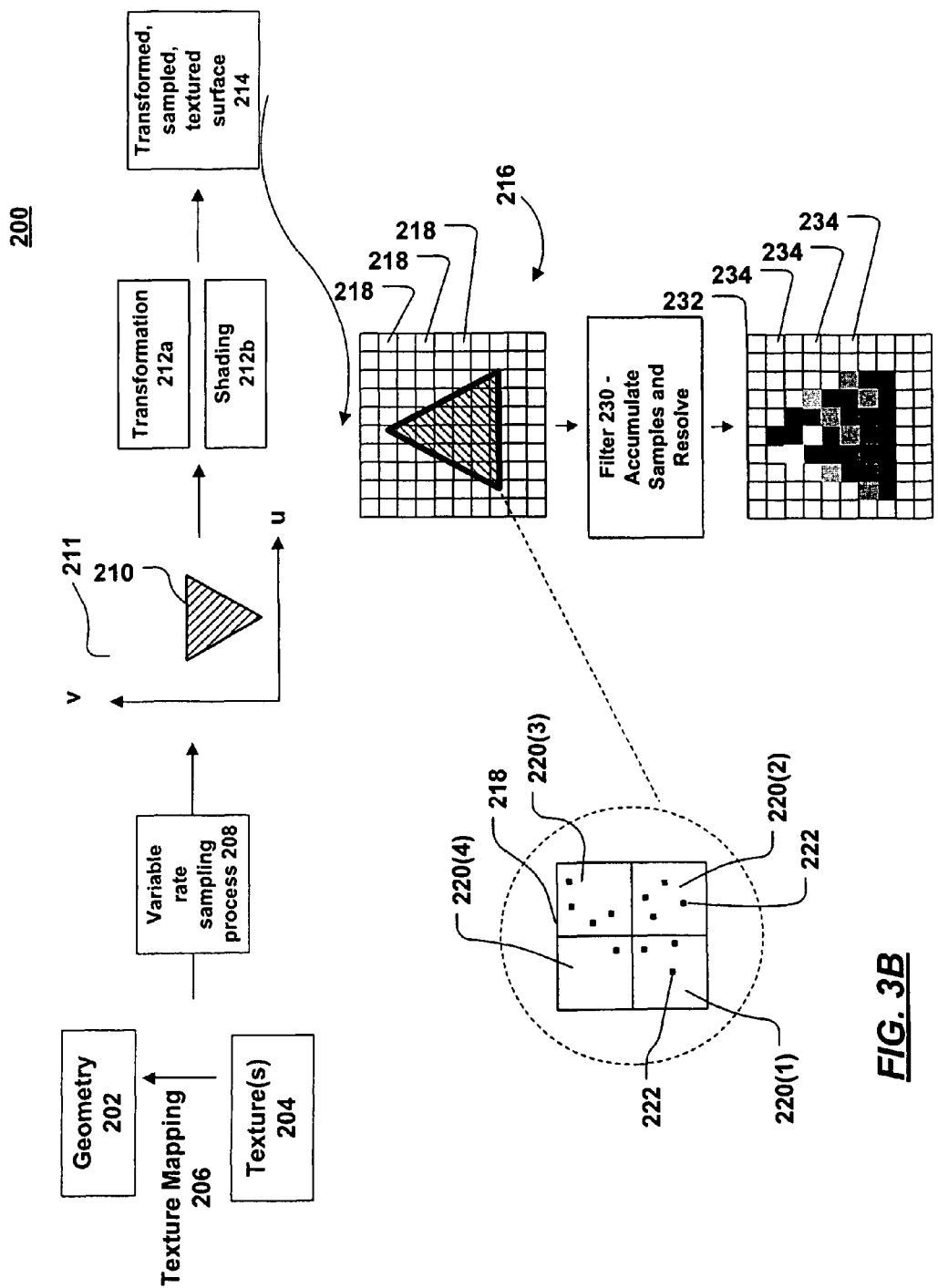

FIGS. 3A and 3B show an exemplary, non-limiting process 200 of rendering visual content according the invention. In the example of FIG. 3A, texture 204 is applied to geometry 202 according to texture mapping 206. In order to achieve this goal, variable rate sampling process 208 of the invention is applied to the textured surface. Sampling is the process whereby geometry—which is essentially a continuous function in space—is captured in the form of representative "sample" points. The "variable rate" nature of sampling process 208 refers to sampling the content at different rates depending upon the frequency, i.e., level of detail present, in different parts of the content. Variable rate sampling is discussed in greater detail below.

The surface geometry 202 and texture(s) 204 are combined to produce a representation of a textured surface 210 in (u, v) space 211. In this regard, textured surface 210 is represented as a set of 2-D sample points having sufficient density in relation to the frequency of the content, any subsequent transformation that takes place and the parameters for the display device to ensure that there is no under-sampling. It should be noted that, due to the variable rate nature of the sampling process 208 that produces these sample points, the density is usually non-uniform throughout the surface. For instance, as general rules, the density of sample points tends to be higher in portions of the textured surface that were generated either from high-frequency portions of the textured surface, or from places which, relatively speaking, are magnified or otherwise require additional samples as a result of a transformation or an associated parameter.

Transformation 212a is then applied to textured surface 210. A transformation (e.g., rotation, translation, magnification, minification, etc.) is typically represented as a matrix, and transformation 212a can be achieved through matrix multiplication followed by a perspective divide. In many conventional processes, transformations are performed on an underlying geometry rather than on a sampled image—i.e., by applying the transformation, and then sampling transformed, textured content later in the process. A shading algorithm 212b may also be applied which takes a geometry and textures and produces a color associated with each point sample generated. A shading algorithm 212b can be thought of as a kind of transformation 212a. In one embodiment of the invention, process 200 advantageously differs from convention by sampling prior to transformation, however, transformation 212a, and the parameters of the rendering device, are nonetheless taken into account since these factors bear on the level of detail required in the destination. Thus the variable rate sampling process 208 ensures that bins 220 of the sample squares 218 at the rendering device each receive at least a predetermined number of samples. In one embodiment, the minimum sampling rate that can be selected that nonetheless ensures that each bin will have at least one sample is utilized by sampling process 208.

Applying transformation 212a and/or shading algorithm 212b to textured surface 210 produces a transformed, textured surface 214. As before, surface 214 is represented by sample points, although the sample points are in different locations in space from where they had been prior to transformation. The sample points of surface 214 are mapped into a frame buffer or region buffer 216 of a rendering device 232 composed of sample squares 218. Each sample square 218 corresponds to a pixel 234 on device 232 on which the image represented by surface 214 is to be displayed—that is, each sample square 218 generally represents an area equal to the size of a pixel 234. Typically, there is one bin 220 associated with each sample square, although as the example of FIG. 3B illustrates, the process of the invention can be carried out wherein there are more than one bins per sample square. In such a case, all of samples in the bins, e.g., 220(1), 220(2), 220(3) and 220(4) for a sample square 220 are accumulated and resolved according to the filtering of the invention. Display device 232 may, for example, be the monitor 191 shown in FIG. 2B.

In accordance with another aspect of the invention, once the samples are forward mapped from the transformed, textured surface onto sample squares 218, process 200 proceeds to determine the setting of pixels 234 from the samples of the bin(s) of the corresponding sample squares, in grey scale or color terms. In general, this determination is based on how many samples are in the bin(s) of a sample square, the values of those samples, and how they are distributed throughout the sample square. For example, FIG. 3A shows the detail (indicated by the enlargement encircled by dashed lines) of one of the sample squares 218, which has bin 220. Dot 222 represents an actual sample point from transformed, textured surface 214 which mapped to bin 220 of this exemplary sample square. In the example of FIG. 3A, only one sample has mapped to bin 220. Thus, the filtering process 230 makes its determination for the respective pixel value for this bin 220 through the position of the sample and its corresponding value. In the example of FIG. 3B, there are four bins in the sample square, each having received a different number of sample points according to the variable rate sampling of the invention. In accordance with the filtering of the invention, accumulation and resolution is performed over all of the samples received by the four bins.

Since the variable source sampling rate techniques of the invention ensure that the worst case scenario is that a bin receives only one sample, typically, there is more than one sample available for a bin 220, such as is illustrated in FIG. 3B. By analyzing how sample points are distributed throughout the various bins of a sample square, detailed information can be gleaned about what surface 214 looks like in the area represented by the sample square. Based on the distribution of sample points in the bins, it is possible to determine—or at least to estimate with some accuracy—certain features about the nature of the image in the sample square: e.g., whether the image passes through the center of the sample square or just nicks the corner, whether the sample square represents a dense or sparse portion of the image, or any other definable feature about nature of the image. Thus, in FIG. 3B, there are a lot of samples in bin 220, or alternatively in sub-bins 220(1), 220(2), 220(3) and 220(4). Accordingly, filtering process 230 can accumulate and apply resolution, e.g., weighted averaging, utilizing all of the samples of the bin 220, or perform the same at the sub-bin level.

Generally, the number and boundaries of bins corresponding to a sample square are pre-defined, and thus the sampling rate of sampling rate process 208 is selected such that each bin, or each sample square, receives at least a predetermined number of sample points, e.g., at least one sample point.

Thus, after the sample points in sample squares 218 have been assigned to bins, filter 230 is used to evaluate the bins to determine what color or grey scale values are to be assigned to a given pixel 234. Filter 230 may make this decision based on a variety of algorithms. In one embodiment, accumulation and resolution of samples in each bin determines the RGB values or grey scale value of the corresponding pixel. In one embodiment, filter 230 considers, for each sample square, the position and size of each bin, and the number of sample points in each bin, and computes a representation of the samples in, or contents of, the bins associated with the pixel; the pixel is then assigned a grey scale value or color values in accordance with the scalar value or values, respectively. In this regard, the weight accorded to each sample, for example, may be computed based upon the local area of image projection in the neighborhood of the point samples. In some cases, only one sample will map to a bin, in which case the resolution process of the invention refers to utilizing the values of the one sample.

Following the filtering process, an image is displayed on display device 232 by assigning pixels 234 their associated values by the rasterization component of the display device 232. As FIGS. 3A and 3B show, pixels 234 are assigned values in a pattern that approximately represents the triangular shape of surface geometry 202, and the striped pattern applied by the texture mapping, although at a resolution that is limited by the pixel size of display device 232. In this case, a mere black and white image is shown for simplicity of illustration, but the techniques are generalized. The accumulation and resolution techniques thus behave to antialias the image. For example, where a stairstepping approach would result from the triangle on display, the antialiasing filter 230 of the invention behaves to average, or smooth the edges at the boundaries, where stairstepping would otherwise occur.

Variable Rate Sampling

Sampling is the process whereby data about a geometry is gathered by evaluating individual points on the geometry. As noted above, the geometry itself is essentially a continuous function in space. Sampling evaluates individual points in the geometry, so that the geometry may be represented by these points.

The advantage of variable rate sampling arises from the fact that content has different "frequencies." The "frequency" of visual content is a quantity that reflects the extent to which the content is non-uniform in a given region. For example, in a grey scale graphics system, an entire region covered with black has very low frequency content, since the color in the in the region is uniform and does not change as the content is traversed. Alternating one-inch bands of black and white would have higher frequency content overall; with high frequency content at the edges of the bands, where a high amount of change is taking place, but with low frequency content in the bands where the content is uniform. In general, visual content that has greater level of detail, sharp edges and contrasts has high frequency content. In accordance with the invention, for any content, the high and low frequency regions are identified, and these regions are sampled at different rates. This is "variable rate" sampling, in the sense that a given piece of content is sampled at a rate that varies depending upon the frequency of the region being sampled. In addition to the frequency content of the source, the invention takes into account any transformation that takes place with respect to the data and the parameters.

Figure 4A:
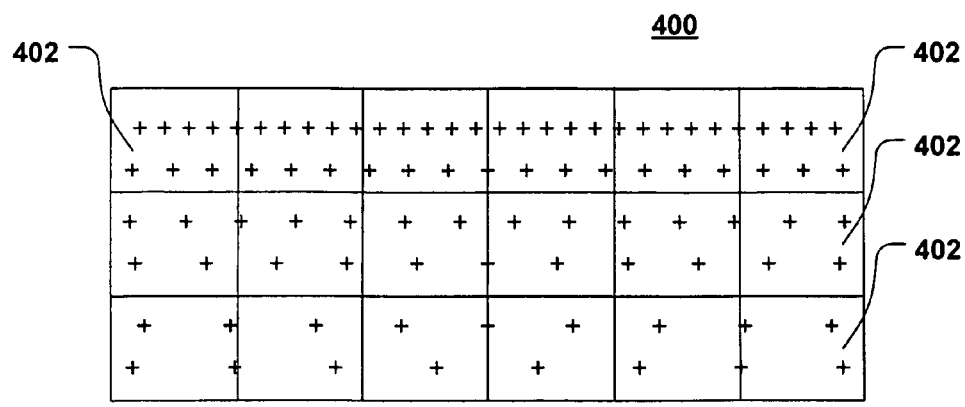
FIG. 4A illustrates a first aspect taken into account in accordance with the variable-rate source sampling of the invention.

FIG. 4A shows how variable rate sampling may be applied to a source 400, such as a textured surface, in accordance with an embodiment of the invention. The frequency of the content is represented by the proximity of detailed changing samples (plus signs), with more densely located plus signs indicating a region of higher frequency content. Thus, content near the top of surface 400 has a higher frequency, and content near the bottom has a lower frequency. The surface may be covered with tiles 402. The content in each tile 402 is sampled separately, and the appropriate sampling rate for each tile can be separately assessed. For example, one way to assess the frequency of a tile is to determine the highest frequency present within the tile and to sample the entire tile at a rate appropriate for the highest frequency, taking into account any subsequent transformation and parameters in order to ensure that each bin of the sample squares receives at least one sample. This can be achieved by oversampling the entire surface, for instance. Thus, the highest frequency present within a tile (i.e., the tile's "worst case") controls the sampling rate for the entire tile. When this method is used, there is an advantage in dividing a surface into a larger number of tiles, since the influence of an anomalous worst case on the sampling rate will be limited to a smaller tile, thus reducing the overall number of samples generated for the geometry. However, increasing the size of the tiles eventually reaches a point of diminishing returns and does not appreciably reduce the number of samples. It should be noted that other methods of assessing the frequency of a tile are possible—e.g., using an average of the frequencies present within the tile, using a modified "highest frequency" assessment in which anomalies within the frequency range for a tile are detected and disregarded in the assessment of a tile's highest frequency, etc.

Figure 4B:
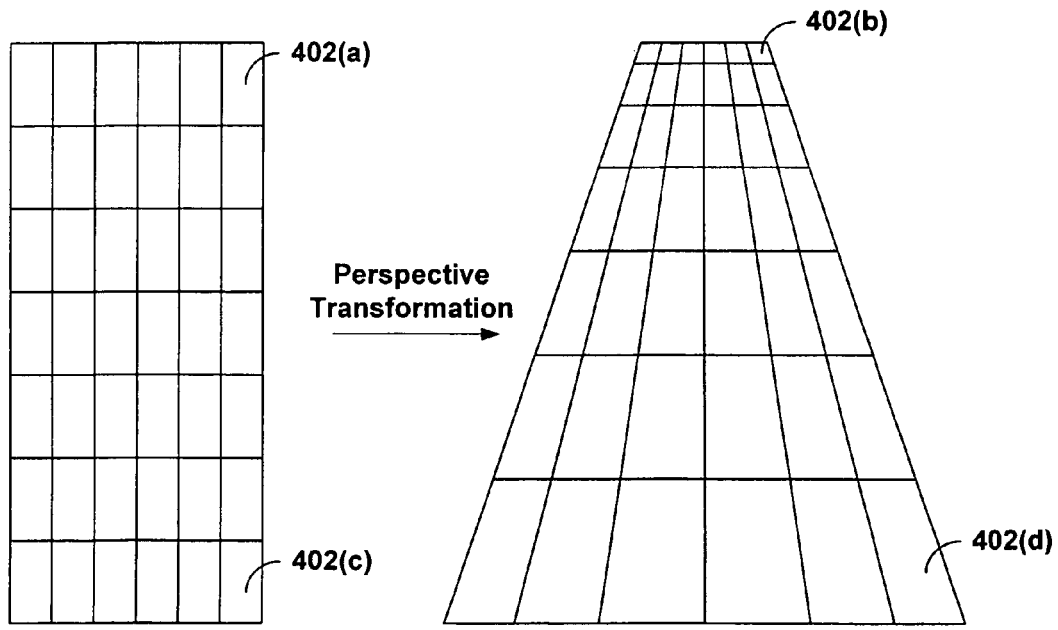
FIG. 4B illustrates a second aspect taken into account in accordance with the variable rate source sampling of the invention.

FIG. 4B illustrates that the variable sampling rate processes of the invention are also dependent upon any transformation that takes place to the content. In the perspective transformation of FIG. 4B, a uniform checkerboard pattern, having roughly equal frequency content over the surface area of a plane, will need a higher image sampling rate along the foreshortened direction. This, however, will naturally occur when a uniformly-spaced sampling pattern over the plane is mapped forward to the image using a perspective transformation. Samples naturally cluster in precisely those screen regions that require more oversampling. Neglecting coverage issues, the same number of samples are necessary in each tile if the frequency content in each tile is equal. But those samples will cluster in the image, so that image bins at the top will receive many more samples than image bins on the bottom. Considering coverage, magnified regions, such as at the bottom, will require more source samples. Even so, image bins at the top will resolve over many more samples. Thus, the adaptive sampling on the image need not require variable sampling at the source, i.e., the transformation, e.g., perspective transformation, can cause irregularities. The parameters of the rendering device are also taken into account.

There are many ways of varying the source sampling rate, depending on the type of signal. Real imagery is stored as a discrete image of finite resolution, but is easily interpolated to higher resolution using, for example, bilinear or bicubic interpolation. Text and 2-D vector graphics is usually represented analytically, allowing synthesis of arbitrary resolution images. 3-D graphics typically textures geometric representations like triangle meshes with 2-D discrete images. Such triangles are continuous representations that can be sampled at arbitrary resolution. Representing geometry as geometry maps allows simple interpolation to generate point samples at arbitrary resolution without having to analyze and sample over individual triangles.

A question thus determined by the invention is how much source sampling is enough to ensure at least one sample maps to each of the destination bins, e.g., 4×4 destination bins per pixel. As mentioned in the background, Grossman and Dally describe a criterion that guarantees coverage given a uniform, rectangular destination sampling lattice, whereby the length of the longest side of an (imaginary) triangle mesh through the mapped source samples must not exceed the distance between destination samples. Evaluating this metric at numerous source samples, however is impractical. Thus, the invention divides the source imagery into tiles, for example, as illustrated in FIGS. 4A and 4B, so that the appropriate amount of source sampling or oversampling can be chosen independently for each tile, using a conservative estimate. Given a continuous mapping function, such as a 2-D perspective transformation or perspective projection of a 3-D parametric surface, this estimate can be derived by looking at the Jacobian of the mapping function, S(u, v), which maps source locations (u, v) in a domain tile D to destination locations (x, y). S maps unit-length distance between source samples to unit-length distance between accumulation bin centers in the destination. The invention then performs a worst-case analysis of the differential version of the Grossman and Dally criterion, via $$\Gamma = \sqrt{\max_{(u,v) \in D} (S_u \cdot S_u, S_v \cdot S_v, S_u \cdot S_u + S_v \cdot S_v - 2S_u \cdot S_v)}$$

where $S_u$ and $S_v$ represent the partial derivatives of S with respect to u and v. The three elements in the max represent the differential edge lengths of a triangle mapped from the domain; specifically, the first two terms are the lengths of the mapped tangent vectors and the third is the edge length of the "diagonal" between them. For the 2-D perspective transformation, a simple estimate of the maximum over D is to compute it at the four corners of the domain rectangle and take the maximum. More complicated mapping functions can be handled heuristically by sampling over the tile as well. The invention can then uniformly sample over the tile D using the sampling rate Γ to guarantee coverage. The required oversampling rate Γ is less than 1 when the source sample is being "minified", in other words, decimated. In that case, an opportunity exists to decrease the number of source samples by selecting samples from a coarser, pre-filtered level of detail (LOD) sequence if one exists, or perhaps by synthesizing the source image at reduced resolution, say for text images. On the other hand, unlike previous approaches, our approach performs proper antialiasing no matter how many samples accumulate in the bins. Inconvenient pre-filtering is therefore not a necessity to eliminate aliasing, but rather a way of decreasing input bandwidth (more specifically, of decreasing the necessary number of point samples transmitted to the second, sample accumulation/resolution phase). For instance when the resolution process is an averaging process, more tilesrequire fewer samples because the worst-case analysis becomes more like the average in smaller tiles. The two curves represent two scenarios: "unclamped", in which the input signal can be arbitrarily resampled, and "clamped" which limits this resampling to the next finest level in a static, power of 2 image hierarchy, i.e., a MIP-Map pyramid.

Diminishing returns with decreasing tile size is evident at about 8 1-D tile divisions (64 total tiles), in either case. With the tiling approach of the invention, the required source oversampling rate is determined separately in each tile to reduce the number of samples.

As discussed above in connection with FIGS. 3A-3B, the textured surface undergoes a variable-rate sampling process 208. The variable rate sampling process are essentially described in connection with FIGS. 4A and 4B: the source is "tiled," and different tiles are sampled at different rates depending upon some assessment of the frequency content present in the tile in addition to an assessment how the content will be transformed prior to binning.

Applying a Texture to a Surface: Geometry Maps

As discussed above in connection with FIGS. 3A-3B, the texture 204 is applied to the geometry 202 to yield a textured surface represented by sample points. The texture is connected to the geometry using the geometry map 202 since both are implicitly related by the continuity of the (u, v) coordinate system.

In this regard, surface geometry 202 can be described as a function S(<u,v>), where <u,v> are parameters that together identify a point on the surface. S(<u,v>) is essentially the parametrization of the mesh, where the outputs of the function S, denoted by coordinates x, y, and z, are the horizontal, vertical, and depth dimensions, respectively. The geometry map can conceptually be thought of as a 2-D image itself, where the structure of the (u,v) points is implicitly a 2-D rectilinear array. Explicit values for a particular (u,v) coordinate thus may be inferred from the position of the sample in the 2-D array.

As mentioned in the overview of the invention, a method suitable to forward mapping for texturing the geometric representation wherein variable sampling rates have been applied is to use a geometry map, defined as a map from the texture domain to locations on the 3-D surface, essentially forming its parameterization. The parameter space of the surface can then be traversed in a convenient order, performing regulated source sampling of the surface image.

Flow of Rendering Process

Figure 5:
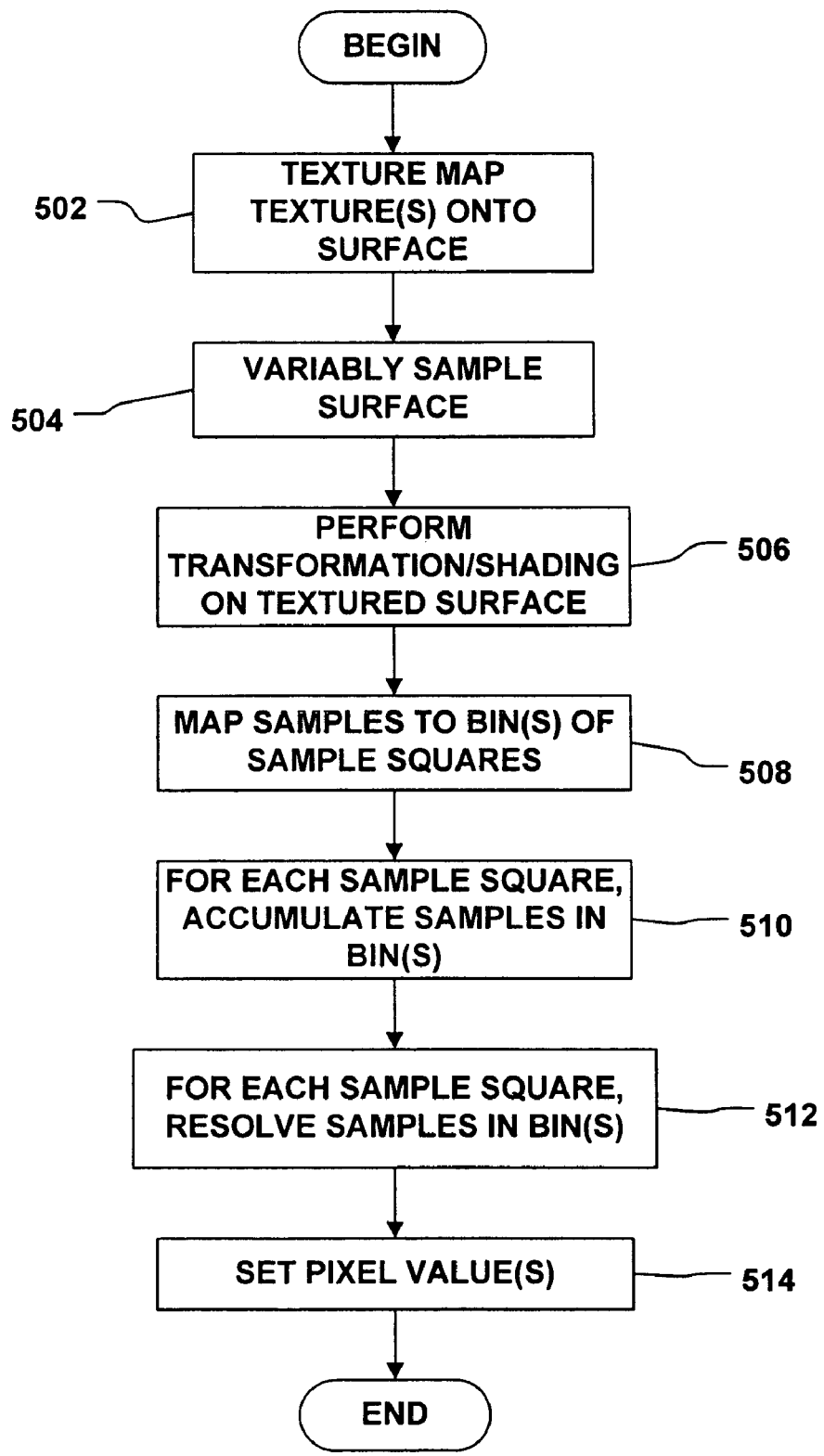
FIG. 5 is an exemplary flow diagram illustrating the variable rate source sampling, and accumulation and resolution techniques of the invention.

FIG. 5 describes, in the form a flow diagram, an exemplary process of rendering content in accordance with the invention. At step 502, texture mapping of the texture(s) to the geometry is performed. At step 504, the surface is tiled, as described above, and for each tile, a sampling rate is determined according to any of the above-described procedures that ensures that at least a predetermined number of samples is mapped to each bin. The surface is sampled according to the determined sampling rates at step 504. Optionally, at 506, a transformation and/or shading can be applied to the textured surface. At step 508, the samples are assigned to bin(s) of sample squares corresponding to pixels of a rendering device, such as a monitor. Each sample square is a portion of the (x, y) plane that corresponds to a pixel on the device on which the textured, transformed surface is to be displayed. As a result of the sampling processes of 502 to 508, each bin is assured to receive at least one sample, and thus undersampling that results from prior art forward mapping processes is eliminated. At steps 510 and 512, the samples of the bin(s) in each sample square are filtered according to accumulation and resolution techniques to determine the values for the pixels that correspond to the sample squares. At step 514, the pixels are set in accordance with the determinations reached in step 512.

Exemplary Non-Limiting Architecture

A goal achieved by the invention is simplicity. While variable rate source signal sampling consumes bandwidth, it is far simpler than any of the destination hole-filling procedures disclosed by the prior art.

Figure 6:
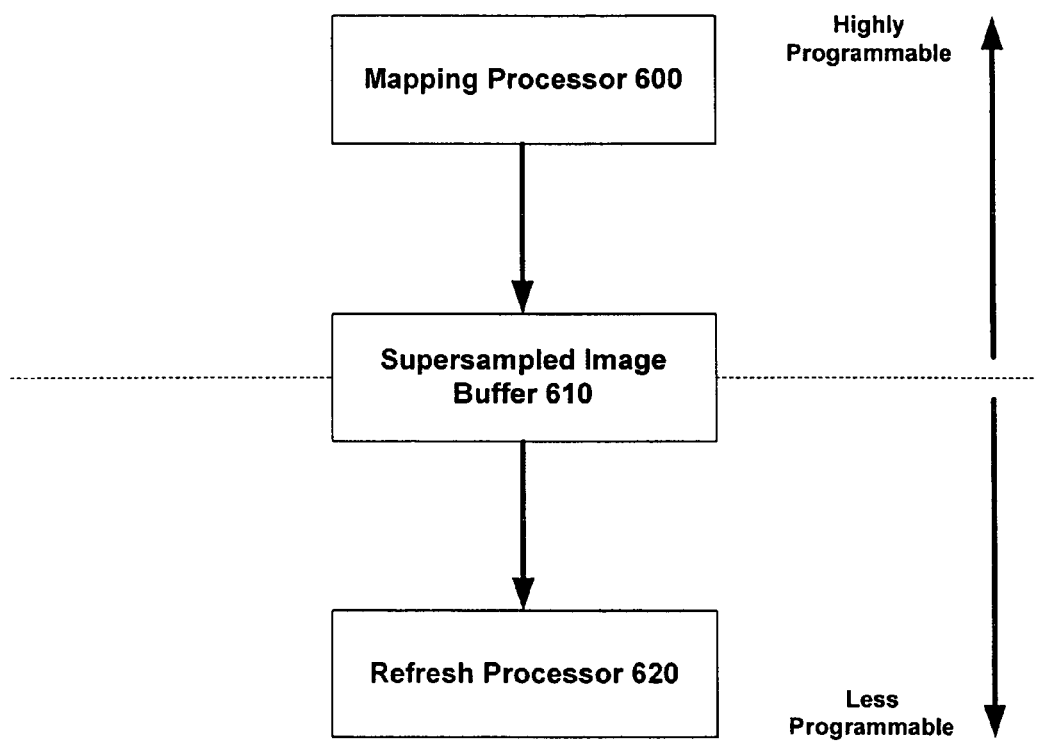
FIG. 6 illustrates an exemplary architecture that may be utilized to implement the invention.

In an exemplary non-limiting architecture, and as illustrated in the block diagram of FIG. 6, the rendering process of the invention is divided into two components: a front-end source sampling, mapping, and shading component 600, and a back-end reconstruction and resampling component 620, with an image buffer 610 for intermediate storage of the samples generated from the variable rate sampling processes of the invention. The front-end traverses the source signal and emits point primitives at sufficient resolution to provide destination coverage and source detail. Since the front-end operates on a number of data types, its function can be relegated to programmable, digital signal processors (DSPs).

The back-end component's function is common across source representations and its processing can be hardwired into a display refresh processor 620.

The components of the display system are the mapping processor 600, the supersample store 610, and the filter and refresh processor 620, shown in FIG. 6. The sampling and mapping functions outlined above are highly adaptive and operate on a variety of data types, including images, surfaces, and volumes. While a non-limiting choice, arrays of DSPs serve well for these tasks. The back end of the process, reconstruction/filtering/resampling, may be suited for fixed function hardware, or today's flex function coprocessors.

The reconstruction, filtering and resampling of the invention can be performed on the fly. Alternatively, filtering and decimation to the display's sampling rate with similar hardware could be performed, saving intermediate results at lower (non-supersampled),resolution and compositing the layers, as in the work of Torborg and Kajiya.

Combining contributions from several sources can be problematic when visibility computations have been pushed to the subpixel level. One solution is a more complex form of intermediate storage, such as an A-buffer. Even though visibility calculations are not embedded in the refresh processor in accordance with the invention, combining samples at sub-pixel resolution achieves flexibility.

In one non-limiting embodiment, intermediate results are stored in a supersampled buffer 610 with bins that correspond to fractions of a display pixel. Samples are accumulated in the bins with a read-modify-write operation that utilizes caching for effective memory utilization. Along with the accumulated subpixel value, a count of the number of samples striking the bin is maintained. Each destination sample is a set of N×N, e.g., 4×4, bins including multiple subsamples to be filtered. Within a bin, multiple samples can be reduced to a single sample using simple averaging, or other resolution techniques including taking the mean, median, mode, minimum, maximum, some other function, etc. Then, while a non-limiting choice, the invention utilizes Mitchell's cascaded box filter to produce the final result at each output sample, whose kernel k(x) is given by the convolution of 4 box filters, i.e.:

$$k(x)=\text{box}(x)*[\text{box}(2x)*\text{box}(2x)]*\text{box}(4x)$$

resulting in a piecewise cubic filter. The initial box(4x) term represents the step that resolves, e.g., averages, samples in each bin. It is nonlinear because the total number of samples in a bin varies, but is be at least one due to the application of the variable rate sampling of the invention. It is noted that the center convolution pair box(2x) * box(2x) represents a simple ¼, ½, ¼ triangle filter in 1-D, which preserves sample locations.

Figure 7:
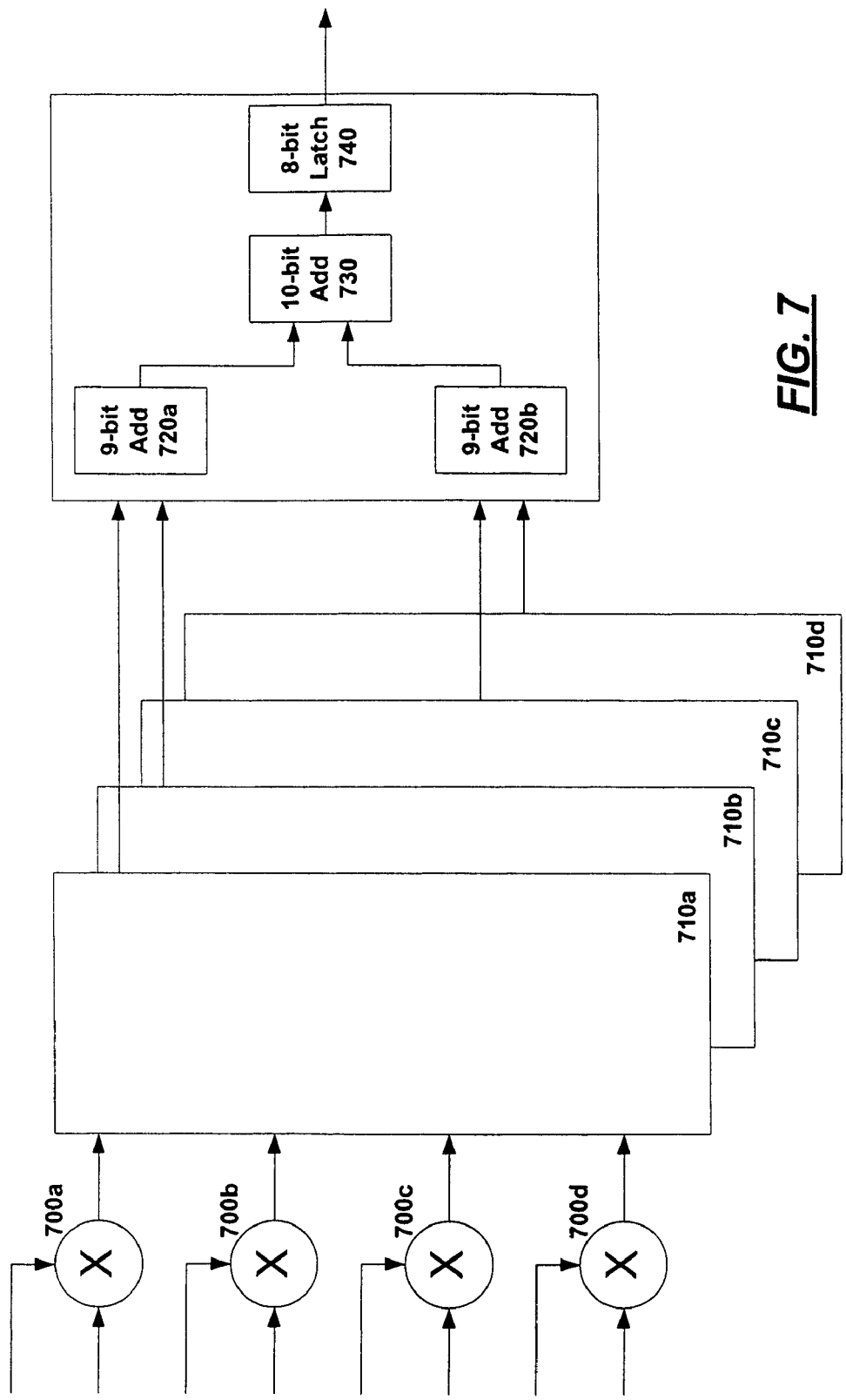
FIG. 7 illustrates an exemplary non-limiting filter that may be utilized in connection with the accumulation and resolution of the invention.
Figure 8A:
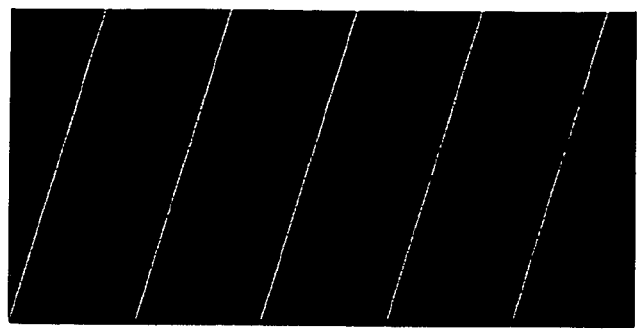
FIGS. 8A to 8E illustrate pure source based sampling for comparison to the techniques of the invention.
Figure 8B:
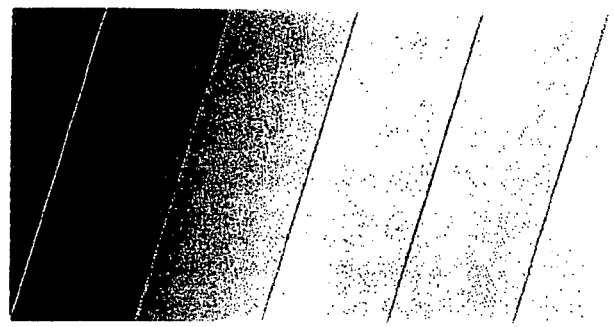
Figure 8C:
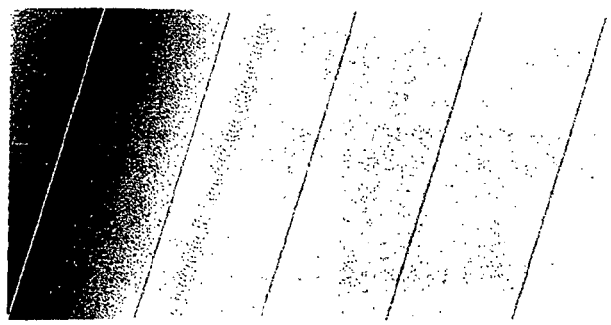
Figure 8D:
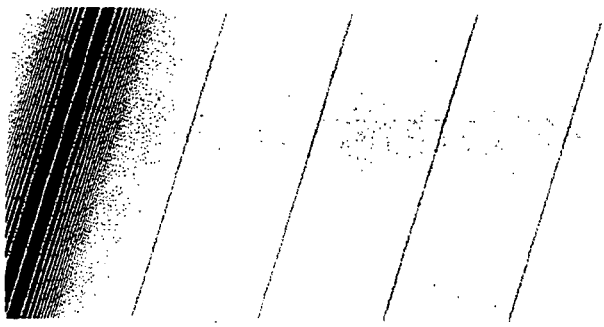
Figure 8E:
Figure 9A:
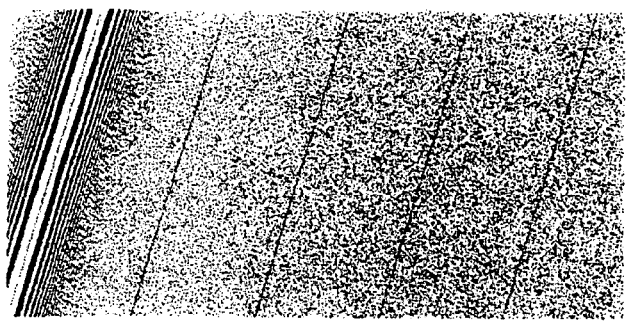
FIGS. 9A to 9E illustrate pure source based sampling in combination with jittered samples for comparison to the techniques of the invention.
Figure 9B:
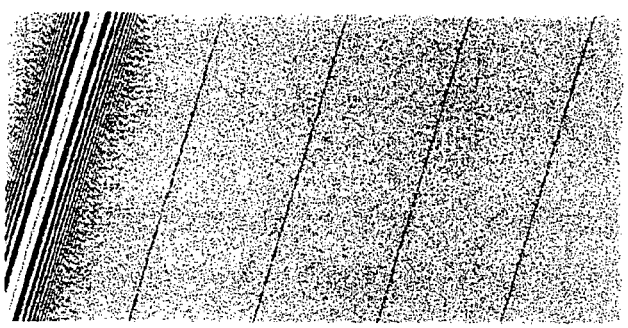
Figure 9C:
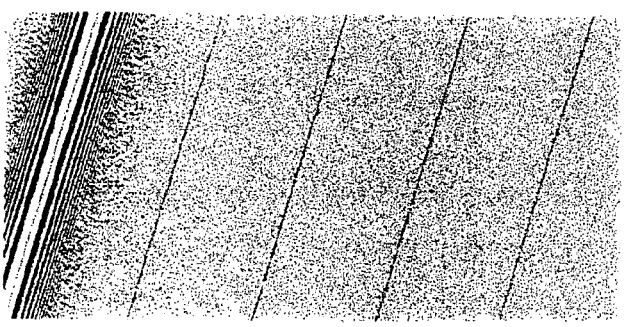
Figure 9D:
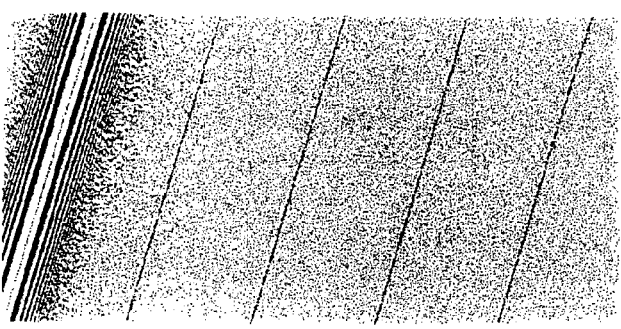
Figure 9E:
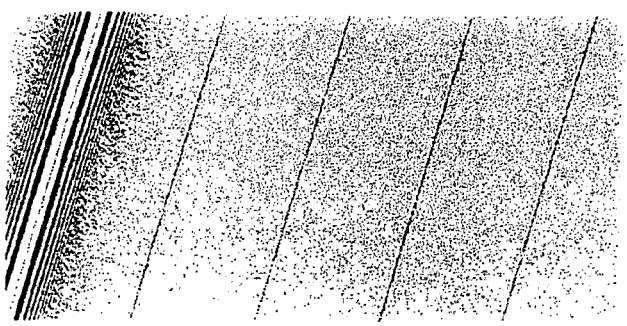

While the filtering can assume a variety of designs in accordance with the invention, a diagram of an exemplary implementation of the filtering stage is shown in FIG. 7.

Each of the 4×4 supersamples corresponding to a display pixel is represented by an accumulator 700a to 700d in the supersample buffer along with a number indicating the number of source samples accumulated by the subpixel. As it is fetched from the buffer by the filtering processor, the accumulated value of the subpixel is multiplied by the reciprocal of the population of the subpixel. In this way the first stage of the three stage filter is distributed across the front MIP-Map pre-filtering (blur), in middle column, and MIP-Map pre-filtering (alias) in the right column. The pre-filtered images were generated using inverse mapping, but the quality from forward-mapping would be similar, if not identical. To select the proper MIP-Map for the right columns, two standard approaches were utilized. The middle column tries to eliminate alias mg as much as possible, and so blurs in the foreshortened, or vertical, direction. The right column tries to preserve as much detail as possible, and so aliases in the non-foreshortened, or horizontal, direction. Such aliasing is even more objectionable in an animation than in a static image.

The approaches described herein as forming the invention can "minify" signals without fear of aliasing. The invention thus provides a very simple and robust display process. Regulated source sampling, as well as accumulation and resolution provide effective coverage for layered, mapped imagery.

The architecture of the invention generates point samples that include 2-D positional information, among other information like z-buffer information, for making a decision as to which bin a sample is placed. In addition to generating the samples, the source sampler computes the mapping from the surface geometry to the screen. Thus, the architecture of the invention includes an initial stage, which samples the 3-D geometry, maps it to the screen, and performs the shading, producing point samples with 2-D image location and color, which are accumulated and resolved by the second stage. The point samples produced by the first stage don't "indicate how the 3-D position maps to the screen"—this has already been computed by the first stage. Thus the first stage includes sample interpolation/decimation, mapping and shading, and the second stage includes accumulation and resolution.

As mentioned above, while exemplary embodiments of the present invention have been described in connection with various computing devices and network architectures, the underlying concepts may be applied to any computing device or system in which it is desirable to forward mapping. Thus, the techniques for providing improved signal processing in accordance with the present invention may be applied to a variety of applications and devices. For instance, the algorithm(s) of the invention may be applied to the operating system of a computing device, provided as a separate object on the device, as part of another object, as a downloadable object from a server, as a "middle man" between a device or object and the network, as a distributed object, etc. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent forward mapping achieved by the invention.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues-to proliferate. Still further, the present invention may be implemented in or across a plurality of processing chips or devices, and storage may similarly be effected across a plurality of devices. Moreover, the invention may be applied to a variety of image processing applications wherein variable rate source sampling, and accumulation and resolution of forward mapped point samples can be applied, ranging from 3-D graphics applications to applications wherein images recorded in a recording/storage environment are mapped to the arbitrary requirements of a display environment, e.g., when an image recorded on a CCD is mapped to an arbitrary quadrilateral of an LCD. Further, as emphasized again here, it is noted that some of the representative embodiments of the invention show a one-to-one correspondence of "bins" to "pixels." The invention is not considered to be so limited. For instance, the architecture and concepts described herein can be applied to non-pixel based displays that implicate forward mapping. Moreover, there should be no inference from the embodiments described herein that there is a necessary correspondence of bin locations to display pixel locations, or other locations in the destination device. Additionally, the use of regular sub-pixel locations for bins is purely for implementation convenience, and is not a constraint posed by the architecture of the invention. Therefore, the present invention should not be limited to any single embodiment, but rather should be construed in breadth and scope in accordance with the appended claims.

What is claimed is:

1. A computer-implemented method for determining a sampling rate for regions of a display surface, the computer implemented method comprising using a computer for:

forward mapping, by a computer having a memory and a processor, a plurality of point samples from a source image to a destination image plane, wherein said forward mapping is conducted by a rendering algorithm that samples said source image, selects a destination image, and maps said point samples directly onto said destination image plane by transitioning through each of said point samples from said source image in order, and determining sample positions for each of said point samples in said destination image plane;

dividing a memory location associated with said destination image plane into a plurality of bins;

assessing that a first of said plurality of bins has a first frequency, wherein the first frequency is determined based on the point samples from the source image mapped onto the destination image, and wherein the first frequency is correlated with an amount of detail in a portion of the source image associated with a bin or an amount of contrast in the portion of the source image associated with the bin;

sampling said first bin at a first rate, wherein said first rate is calculated using the first frequency, said sampling yielding at least one sample value, and wherein said first rate is further calculated based on a transformation that said point samples associated with said first of said plurality of bins undergoes prior to rendering;

determining a pixel setting for a pixel corresponding to said first bin, said determining accounting for at least a distribution of samples in said first bin and for said at least one sample value.

2. The method of claim 1, further comprising displaying an image on a rendering device, wherein at least one property of said image is based on samples generated by said sampling.

3. The method of claim 1, further comprising accumulating at least one point sample forward mapped to the memory location.

4. The method of claim 1, further comprising resolving over the at least one point sample based on at least one of (A) the location of the at least one point sample in a sample square of a destination device, (B) at least one value associated with the at least one point sample, (C) the location of at least one neighbor of the at least one point sample and (D) at least one value associated with the at least one neighbor of the at least one point sample.

5. The method of claim 1, wherein each point sample maps to only one bin.

6. The method of claim 1, wherein at least one bin receives at least a predetermined minimum number of the plurality of point samples from said forward mapping.

7. The method of claim 6, wherein said predetermined minimum number is one.

8. The method of claim 1, further comprising receiving the plurality of point samples into the plurality of bins based on said point samples' locations.

9. The method of claim 1, further comprising determining at least one value for at least one bin of the plurality of bins based on at least one sample in the at least one bin.

10. The method of claim 9, further comprising setting at least one of a grey value and a color value in accordance with said at least one value.

11. The method of claim 1, further comprising applying at least one texture to said memory location to create a textured memory location, wherein said sampling is conducted on the textured memory location.

12. A machine readable storage medium encoded with executable instructions for determining a sampling rate for regions of a display surface, the instructions comprising:

instructions for forward mapping a plurality of point samples from a source image to a destination image plane, wherein said forward mapping is conducted by a rendering algorithm that samples said source image, selects a destination image, and maps said point samples directly onto said destination image plane by transitioning through each of said point samples from said source image in order, and determining sample positions for each of said point samples in said destination image plane;

instructions for dividing a memory location associated with said destination image plane into a plurality of bins;

instructions for assessing that a first of said plurality of bins has a first frequency, wherein frequency is determined based on the point samples from the source image mapped onto the destination image, and wherein the first frequency is correlated with an amount of detail in a portion of the source image associated with a bin or an amount of contrast in the portion of the source image associated with the bin;

instructions for sampling said first bin at a first rate, wherein said first rate is calculated using the first frequency, said sampling yielding at least one sample value, and wherein said first rate is further calculated based on a transformation that said point samples associated with said first of said plurality of bins undergoes prior to rendering;

instructions for determining a pixel setting for a pixel corresponding to said first bin, said determining accounting for at least a distribution of samples in said first bin and for said at least one sample value.

13. The machine readable storage medium encoded with executable instructions of claim 12, further comprising instructions for displaying an image on a rendering device, wherein at least one property of said image is based on samples generated by said sampling.

14. The machine readable storage medium encoded with executable instructions of claim 12, further comprising instructions for accumulating at least one point sample forward mapped to the memory location.

15. The machine readable storage medium encoded with executable instructions of claim 12, further comprising instructions for resolving over the at least one point sample based on at least one of (A) the location of the at least one point sample in a sample square of a destination device, (B) at least one value associated with the at least one point sample, (C) the location of at least one neighbor of the at least one point sample and (D) at least one value associated with the at least one neighbor of the at least one point sample.

16. The machine readable storage medium encoded with executable instructions of claim 12, wherein each point sample maps to only one bin.

17. The machine readable storage medium encoded with executable instructions of claim 12, wherein at least one bin receives at least a predetermined minimum number of the plurality of point samples from said forward mapping.

18. The machine readable storage medium encoded with executable instructions of claim 17, wherein said predetermined minimum number is one.

19. The machine readable storage medium encoded with executable instructions of claim 12, further comprising instructions for receiving the plurality of point samples into the plurality of bins based on said point samples' locations.

20. The machine readable storage medium encoded with executable instructions of claim 12, further comprising instructions for determining at least one value for at least one bin of the plurality of bins based on at least one sample in the at least one bin.

21. The machine readable storage medium encoded with executable instructions of claim 20, further comprising instructions for setting at least one of a grey value and a color value in accordance with said at least one value.

22. The machine readable storage medium encoded with executable instructions of claim 12, further comprising instructions for applying at least one texture to said memory location to create a textured memory location, wherein said sampling is conducted on the textured memory location.

23. A system comprising a processor, a memory, and a display surface for visual presentation of images, and further comprising means for determining a sampling rate for regions of an image corresponding to regions of the display surface, comprising:

means for forward mapping a plurality of point samples from a source image to a destination image plane, wherein said forward mapping is conducted by a rendering algorithm that samples said source image, selects a destination image, and maps said point samples directly onto said destination image plane by transitioning through each of said point samples from said source image in order, and determining sample positions for each of said point samples in said destination image plane;

means for dividing a memory location associated with said destination image plane into a plurality of bins;

means for assessing that a first of said plurality of bins has a first frequency, wherein frequency is determined based on the point samples from the source image mapped onto the destination image, and wherein the first frequency is correlated with an amount of detail in a portion of the source image associated with a bin or an amount of contrast in the portion of the source image associated with the bin;

means for sampling said first bin at a first rate, wherein said first rate is calculated using the first frequency, said sampling yielding at least one sample value, and wherein said first rate is further calculated based on a transformation that said point samples associated with said first of said plurality of bins undergoes prior to rendering;

means for determining a pixel setting for a pixel corresponding to said first bin, said determining accounting for at least a distribution of samples in said first bin and for said at least one sample value.

24. The system of claim 23, further comprising means for displaying an image on a rendering device, wherein at least one property of said image is based on samples generated by said sampling.

25. The system of claim 23, further comprising means for accumulating at least one point sample forward mapped to the memory location.

26. The system of claim 23, further comprising means for resolving over the at least one point sample based on at least one of (A) the location of the at least one point sample in a sample square of a destination device, (B) at least one value associated with the at least one point sample, (C) the location of at least one neighbor of the at least one point sample and (D) at least one value associated with the at least one neighbor of the at least one point sample.

27. The system of claim 23, wherein each point sample maps to only one bin.

28. The system of claim 23, wherein at least one bin receives at least a predetermined minimum number of the plurality of point samples from said forward mapping.

29. The system of claim 28, wherein said predetermined minimum number is one.

30. The system of claim 23, further comprising means for receiving the plurality of point samples into the plurality of bins based on said point samples' locations.

31. The system of claim 23, further comprising means for determining at least one value for at least one bin of the plurality of bins based on at least one sample in the at least one bin.

32. The system of claim 31, further comprising means for setting at least one of a grey value and a color value in accordance with said at least one value.

33. The system of claim 23, further comprising means for applying at least one texture to said memory location to create a textured memory location, wherein said sampling is conducted on the textured memory location.

* * * * *

UNITED STATES PATENT AND TRADEMARK OFFICE
CERTIFICATE OF CORRECTION

| | | |
|---|---|---|
| PATENT NO. | : 7,956,870 B2 | Page 1 of 1 |
| APPLICATION NO. | : 10/982609 | |
| DATED | : June 7, 2011 | |
| INVENTOR(S) | : John Michael Snyder et al. | |

It is certified that error appears in the above-identified patent and that said Letters Patent is hereby corrected as shown below:

In Face page, in field (63), under "Related U.S. Application data" column 1, line 2, delete "2," and insert -- 28, --, therefor.

Signed and Sealed this
Twenty-third Day of August, 2011

David J. Kappos
*Director of the United States Patent and Trademark Office*